United States Patent
Ouchi et al.

(10) Patent No.: US 9,603,100 B2
(45) Date of Patent: Mar. 21, 2017

(54) TERMINAL DEVICE, COMMUNICATION METHOD, AND INTEGRATED CIRCUIT

(71) Applicant: Sharp Kabushiki Kaisha, Osaka-shi, Osaka (JP)

(72) Inventors: Wataru Ouchi, Osaka (JP); Tatsushi Aiba, Osaka (JP); Shoichi Suzuki, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/889,241

(22) PCT Filed: May 8, 2014

(86) PCT No.: PCT/JP2014/062381
§ 371 (c)(1),
(2) Date: Nov. 5, 2015

(87) PCT Pub. No.: WO2014/181836
PCT Pub. Date: Nov. 13, 2014

(65) Prior Publication Data
US 2016/0081033 A1 Mar. 17, 2016

(30) Foreign Application Priority Data
May 9, 2013 (JP) .................................. 2013-098928

(51) Int. Cl.
*H04B 7/00* (2006.01)
*H04W 52/14* (2009.01)
(Continued)

(52) U.S. Cl.
CPC ............. *H04W 52/146* (2013.01); *H04L 5/14* (2013.01); *H04W 52/243* (2013.01);
(Continued)

(58) Field of Classification Search
CPC ............. H04W 52/146; H04W 52/247; H04W 52/248; H04W 52/50; H04W 72/12;
(Continued)

(56) References Cited

U.S. PATENT DOCUMENTS

| | | | |
|---|---|---|---|
| 8,412,182 B2* | 4/2013 | Moberg ............ | H04W 36/0088 370/280 |
| 8,761,075 B2* | 6/2014 | Kim .................... | H04B 7/0413 370/315 |

(Continued)

FOREIGN PATENT DOCUMENTS

| | | |
|---|---|---|
| WO | 2013/018856 A1 | 2/2013 |
| WO | 2013/047129 A1 | 4/2013 |

OTHER PUBLICATIONS

Samsung, "Power control in flexible subframes for eIMTA", 3GPP TSG RAN WG1 #72, R1-130290, Jan. 28-Feb. 1, 2013, pp. 1-3.

(Continued)

*Primary Examiner* — Dominic Rego
(74) *Attorney, Agent, or Firm* — Keating & Bennett, LLP

(57) ABSTRACT

Provided is a terminal device (2) that communicates with a base station device, including: a reception unit (205) that receives information related to a first configuration and/or information related to a second configuration, and a grant; and a transmission unit (207) that, in a case of an uplink signal being scheduled based on the grant, transmits the uplink signal to the base station device in an earliest uplink subframe on or after a designated subframe from a subframe in which the grant was detected, wherein in a case of the first configuration and the second configuration being set, the transmission unit (207) configures a transmit power control method for respective subframe subsets according to the type of grant.

5 Claims, 10 Drawing Sheets

(51) Int. Cl.
*H04W 52/24* (2009.01)
*H04W 52/50* (2009.01)
*H04L 5/14* (2006.01)
*H04W 72/12* (2009.01)
*H04W 88/02* (2009.01)

(52) U.S. Cl.
CPC ....... *H04W 52/247* (2013.01); *H04W 52/248* (2013.01); *H04W 52/50* (2013.01); *H04W 72/1268* (2013.01); *H04W 72/12* (2013.01); *H04W 88/02* (2013.01)

(58) Field of Classification Search
CPC ........... H04W 52/243; H04W 72/1268; H04W 88/02; H04L 5/14
USPC .................. 455/522, 67.11, 68–70; 370/318
See application file for complete search history.

(56) References Cited

U.S. PATENT DOCUMENTS

| | | | | |
|---|---|---|---|---|
| 9,049,739 | B2* | 6/2015 | Jo | H04W 72/1263 |
| 9,210,674 | B2* | 12/2015 | Lin | H04W 56/001 |
| 9,338,754 | B2* | 5/2016 | Fu | H04W 52/244 |
| 2009/0175187 | A1* | 7/2009 | Jersenius | H04W 52/365 |
| | | | | 370/252 |
| 2010/0029318 | A1* | 2/2010 | Tano | H04W 52/16 |
| | | | | 455/522 |
| 2011/0268087 | A1* | 11/2011 | Kwon | H04L 5/0005 |
| | | | | 370/331 |
| 2012/0051316 | A1* | 3/2012 | Yajima | H04W 72/14 |
| | | | | 370/329 |
| 2012/0147734 | A1* | 6/2012 | Kim | H04L 1/1887 |
| | | | | 370/216 |
| 2013/0107780 | A1* | 5/2013 | Choi | H04W 52/0209 |
| | | | | 370/311 |
| 2013/0272158 | A1* | 10/2013 | Park | H04W 52/242 |
| | | | | 370/252 |
| 2013/0279361 | A1* | 10/2013 | Seo | H04J 11/0053 |
| | | | | 370/252 |
| 2014/0056278 | A1* | 2/2014 | Marinier | H04W 72/044 |
| | | | | 370/330 |
| 2014/0105167 | A1* | 4/2014 | Suzuki | H04W 74/006 |
| | | | | 370/329 |
| 2014/0112219 | A1* | 4/2014 | Li | H04W 72/12 |
| | | | | 370/280 |
| 2014/0126399 | A1* | 5/2014 | Damnjanovic | H04W 72/1252 |
| | | | | 370/252 |
| 2014/0177584 | A1 | 6/2014 | Ouchi et al. | |
| 2014/0219113 | A1* | 8/2014 | Li | H04W 24/08 |
| | | | | 370/252 |
| 2014/0226551 | A1 | 8/2014 | Ouchi et al. | |

OTHER PUBLICATIONS

"3rd Generation Partnership Project; Technical Specification Group Radio Access Network; Evolved Universal Terrestrial Radio Access (E-UTRA); Physical layer; Measurements (Release 10)," 3GPP TS 36.214 V10.1.0, Mar. 2011, pp. 1-13.

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.8.0, Sep. 2009, pp. 1-83.

Ericsson et al., "On standardization impact of TDD UL-DL adaptation", 3GPP TSG-RAN WG1 #69, R1-122016, May 21-25, 2012, pp. 1-3.

NTT Docomo, "Issues Regarding Additional Carrier Type in Rel-11 CA", 3GPP TSG RAN WG1 Meeting #67, R1-114071, Nov. 14-18, 2011, pp. 1-5.

* cited by examiner

FIG. 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

S: Special subframe  U: Uplink subframe  D: Downlink subframe

FIG. 5

| TPC Command Field | Accumulated $\delta_{PUSCH,c}$ [dB] | Absolute $\delta_{PUSCH,c}$ [dB] |
|---|---|---|
| 0 | -1 | -4 |
| 1 | 0 | -1 |
| 2 | 1 | 1 |
| 3 | 3 | 4 |

(a) FIRST TPC COMMAND FIELD

| TPC Command Field | Accumulated $\delta_{PUSCH,c}$ [dB] | Absolute $\delta_{PUSCH,c}$ [dB] |
|---|---|---|
| 0 | -7 | -10 |
| 1 | -5 | -7 |
| 2 | -3 | -4 |
| 3 | -1 | -1 |
| 4 | 0 | 1 |
| 5 | 1 | 4 |
| 6 | 3 | 7 |
| 7 | 5 | 10 |
| 8 | 7 | 13 |

(b) SECOND TPC COMMAND FIELD

FIG. 6

| TPC Command Field | Accumulated $\delta_{PUSCH,c}$ [dB] | Absolute $\delta_{PUSCH,c}$ [dB] |
|---|---|---|
| 0 | -1 | -4 |
| 1 | 0 | -1 |
| 2 | 1 | 1 |
| 3 | 3 | 4 |

(a) FIRST TPC COMMAND FIELD

| TPC Command Field | Accumulated $\delta_{PUSCH,c}$ [dB] | Absolute $\delta_{PUSCH,c}$ [dB] |
|---|---|---|
| 0 | -3 | -6 |
| 1 | 0 | -1 |
| 2 | 3 | 4 |
| 3 | 6 | 9 |

(b) SECOND TPC COMMAND FIELD

FIG. 7

INFORMATION RELATED TO FIRST UPLINK POWER CONTROL (UplinkPowerControl)

COMMON INFORMATION RELATED TO (FIRST) UPLINK POWER CONTROL (FOR PRIMARY CELL)
- p0-NominalPUSCH
- α
- p0-NominalPUCCH
- deltaFList-PUCCH
- deltaPreambleMsg3

COMMON INFORMATION RELATED TO (FIRST) UPLINK POWER CONTROL FOR SECONDARY CELL
- p0-NominalPUSCH
- α

DEDICATED INFORMATION RELATED TO (FIRST) UPLINK POWER CONTROL (FOR PRIMARY CELL)
- p0-UE-PUSCH
- deltaMCS-Enabled
- accumulation-Enabled
- p0-UE-PUCCH
- pSRS-Offset
- filterCoefficient
- pSRS-Offset-Ap
- deltaTxD-OffsetListPUCCH DEDICATED INFORMATION RELATED TO (FIRST) UPLINK POWER CONTROL FOR SECONDARY CELL
- p0-UE-PUSCH
- deltaMCS-Enabled
- accumulation-Enabled
- p0-UE-PUCCH
- pSRS-Offset
- pSRS-Offset-Ap
- filterCoefficient
- pathlossReferenceLinking FIG. 8
EXAMPLE OF COMMON INFORMATION RELATED TO SECOND UPLINK POWER CONTROL
(FOR PRIMARY CELL)
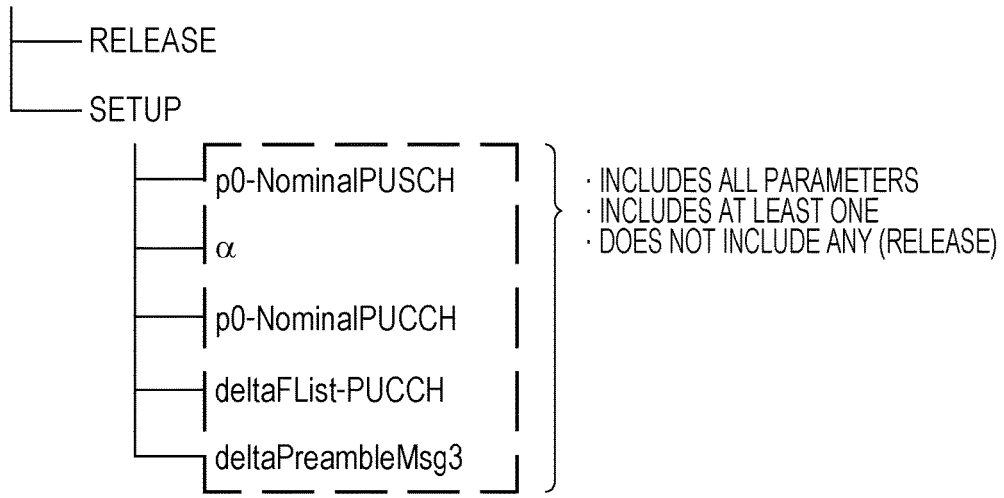
EXAMPLE OF COMMON INFORMATION RELATED TO SECOND UPLINK POWER CONTROL FOR
SECONDARY CELL
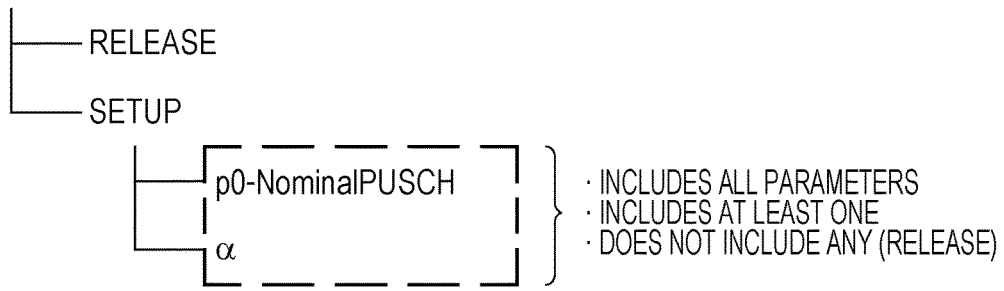

FIG. 9

EXAMPLE OF DEDICATED INFORMATION RELATED TO FIRST UPLINK POWER CONTROL
(FOR PRIMARY CELL)
└── PATH LOSS REFERENCE RESOURCE

EXAMPLE OF DEDICATED INFORMATION RELATED TO FIRST UPLINK POWER CONTROL FOR SECONDARY CELL
└── PATH LOSS REFERENCE RESOURCE

EXAMPLE OF DEDICATED INFORMATION RELATED TO SECOND UPLINK POWER CONTROL
(FOR PRIMARY CELL)
├── RELEASE
└── SETUP
    ├── p0-UE-PUSCH
    ├── deltaMCS-Enabled
    ├── accumulation-Enabled
    ├── p0-UE-PUCCH
    ├── pSRS-Offset
    ├── filterCoefficient
    ├── pSRS-Offset-Ap
    ├── deltaTxD-OffsetListPUCCH
    └── PATH LOSS REFERENCE RESOURCE · INCLUDES ALL PARAMETERS
· INCLUDES AT LEAST ONE
· DOES NOT INCLUDE ANY (RELEASE)

EXAMPLE OF DEDICATED INFORMATION RELATED TO SECOND UPLINK POWER CONTROL FOR SECONDARY CELL
├── RELEASE
└── SETUP
    ├── p0-UE-PUSCH
    ├── deltaMCS-Enabled
    ├── accumulation-Enabled
    ├── p0-UE-PUCCH
    ├── pSRS-Offset
    ├── pSRS-Offset-Ap
    ├── filterCoefficient
    ├── pathlossReference(-r11)
    └── PATH LOSS REFERENCE RESOURCE · INCLUDES ALL PARAMETERS
· INCLUDES AT LEAST ONE
· DOES NOT INCLUDE ANY (RELEASE)

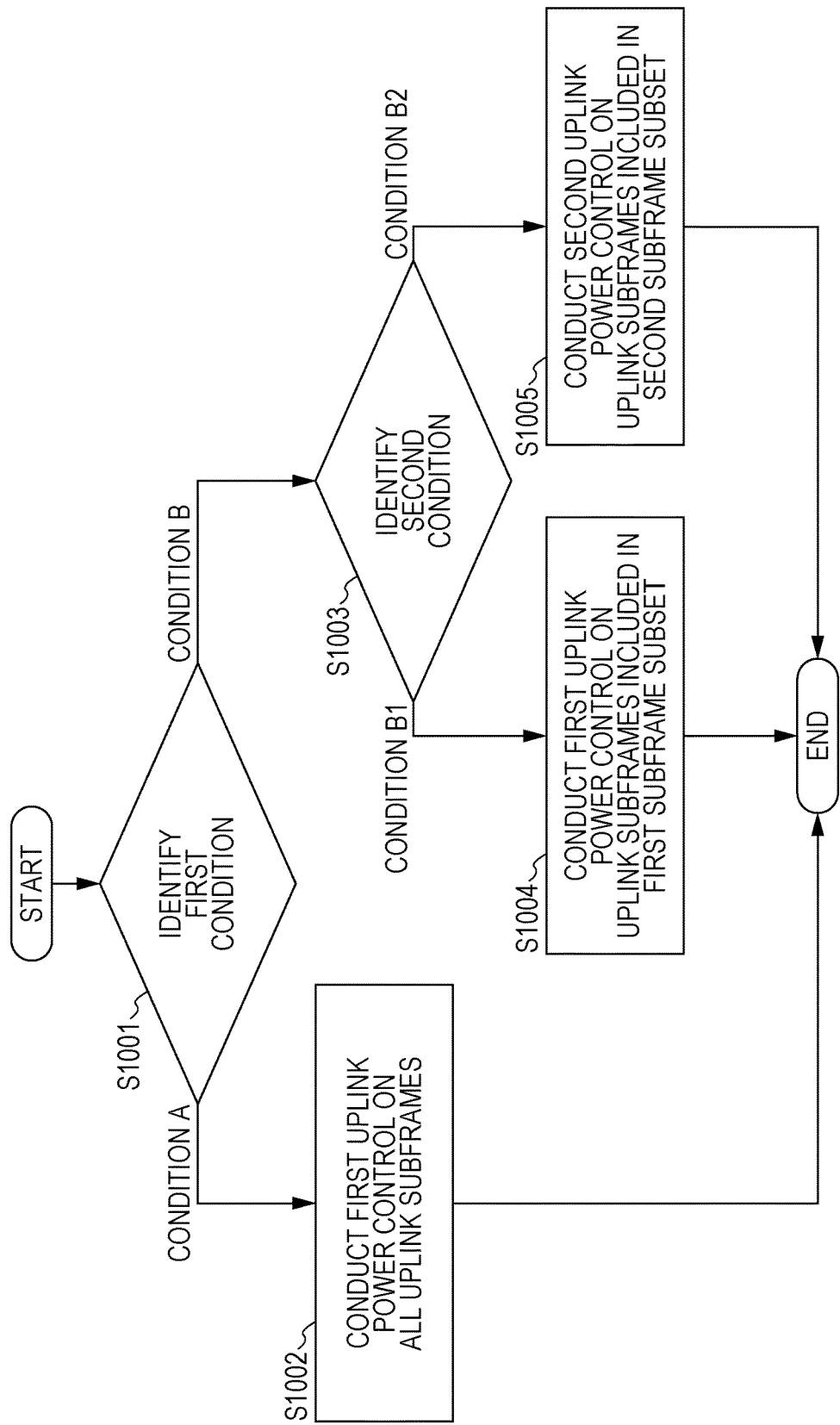

TERMINAL DEVICE, COMMUNICATION METHOD, AND INTEGRATED CIRCUIT

TECHNICAL FIELD

The present invention relates to a terminal device, a communication method, and an integrated circuit.

BACKGROUND ART

In communication systems, such as Wideband Code Division Multiple Access (WCDMA), Long Term Evolution (LTE), and LTE-Advanced (LTE-A) by the Third Generation Partnership Project (3GPP), or wireless LAN and Worldwide Interoperability for Microwave Access (WiMAX) by the Institute of Electrical and Electronics Engineers (IEEE), a base station device (cell, first communication device (communication device different from a terminal device), eNodeB) and a terminal device (mobile terminal, mobile station device, second communication device (communication device different from a base station device), user equipment (UE)) are each equipped with multiple transceiving antennas, and by using multi-input, multi-output (MIMO) technology, data signals are spatially multiplexed, and high-speed data communication is realized.

In such a communication system, in order to realize data communication between the base station device and the terminal device, the base station device needs to control the terminal device in various ways. For this reason, the base station device uses a designated resource to report control information to the terminal device, and thereby conducts data communication in the downlink and the uplink. For example, the base station device realizes data communication by reporting, to the terminal device, information such as resource allocation information, data signal modulation and coding information, information about the number of spatial multiplexing in a data signal, and transmission power control information.

This communication system is compatible with time-division duplexing (TDD). LTE implementing a TDD scheme is also called TD-LTE or LTE TDD. TDD is a technology that uses time-division multiplexing of the uplink signal and the downlink signal to thereby enable downlink and uplink communication in a single frequency band (carrier frequency, component carrier). In LTE, the downlink and the uplink may be switched in units of subframes by configuration in advance. Note that with TDD, subframes in which downlink transmission is available (downlink subframes, subframes reserved for downlink transmission) and subframes in which uplink transmission is available (uplink subframes, subframes reserved for uplink transmission) are defined, and in addition, by providing a guard period (GP), subframes (special subframes) in which downlink transmission and uplink transmission may be switched in the time domain (symbol domain) are defined. Note that in a special subframe, the time slot in which downlink transmission is available is called the downlink pilot time slot (DwPTS), while the time slot in which uplink transmission is available is called the uplink pilot time slot (UpPTS). For example, when a subframe i is a downlink subframe, the terminal device is able to receive a downlink signal transmitted from the base station device, whereas when a subframe j different from the subframe i is an uplink subframe, the terminal device is able to transmit an uplink signal from the terminal device to the base station device. Also, when a subframe k different from the subframe i and the subframe j is a special subframe, the terminal device may receive a downlink signal in the downlink time slot DwPTS, and transmit an uplink signal in the uplink time slot UpPTS (NPL 1). In addition, the ratio of uplink and downlink as well as the ratio of the DwPTS and the UpPTS within a special subframe for realizing a TDD scheme in LTE or LTE-A may each be configured using a table. These tables may be configured by specific information elements (TDD uplink-downlink configuration(s) (TDD UL/DL configuration(s))), TDD configuration(s) (tdd-Config, TDDconfig), and uplink-downlink configuration(s) (UL/DL configuration(s)).

In addition, the application to TD-LTE of a traffic-adaptive control technology, which modifies the ratio of uplink resources and downlink resources according to uplink traffic and downlink traffic (information rate, data rate, communication rate), is being investigated. For example, dynamic modification of the ratio of downlink subframes and uplink subframes is being investigated. As one method thereof, flexible subframes that adaptively switch between being downlink subframes and uplink subframes are being investigated (NPL 2). In a flexible subframe, the base station device is able to receive an uplink signal or transmit a downlink signal. Also, as long as the transmission of an uplink signal in a flexible subframe is not indicated by the base station device, the terminal device is able to conduct a receiving process that treats the relevant flexible subframe as a downlink subframe. Also, TDD that dynamically modifies the (re)configuration of the ratio of downlink subframes and uplink subframes, the uplink and downlink subframes, or TDD UL/DL (re)configuration in this way is called dynamic TDD (DTDD) in some cases.

The communication system is a cellular communication system that arranges a plurality of areas covered by base station devices into cells. Also, a single base station device may manage multiple cells. Also, a single base station device may manage multiple remote radio heads (RRHs). Also, a single base station device may manage multiple local areas. Also, a single base station device may manage multiple heterogeneous networks (HetNets). Also, a single base station device may manage multiple low-power nodes (LPNs).

In the communication system, the terminal device measures a reference signal received power (RSRP) on the basis of a cell-specific reference signal(s) (CRS) (NPL 3).

In the communication system, communication may also be conducted using a part of the carrier (component carrier) defined in LTE in which a physical channel or signal is not deployed. Herein, such a carrier is called the New Carrier Type (NCT). For example, in the new carrier type, the cell-specific reference signal, physical downlink control channel, and a synchronization signal (primary synchronization signal, secondary synchronization signal) do not have to be deployed. Also, the introduction of a physical channel for conducting mobility measurement and time/frequency synchronization detection (physical discovery channel (PDCH), new discovery signal(s) (NDS)) into a cell configured with the new carrier type is being investigated (NPL 4). Note that the new carrier type is also called the additional carrier type (ACT) in some cases. Also, as a contrast to the NCT, the existing carrier type is also called the legacy carrier type (LCT) in some cases.

CITATION LIST

Non Patent Literature

NPL 1: 3rd Generation Partnership Project Technical Specification Group Radio Access Network; Evolved Universal Terrestrial Radio Access (E-UTRA); Physical Channels and Modulation (Release 8), TS36.211 v8.8.0 (2009-09).
NPL 2: "On standardization impact of TDD UL-DL adaptation", R1-122016, 3GPP TSG-RANWG1 Meeting #69, Prague, Czech Republic, 21-25 May 2012.
NPL 3: 3rd Generation Partnership Project Technical Specification Group Radio Access Network; Evolved Universal Terrestrial Radio Access (E-UTRA); Physical layer; Measurements (Release 10) 30 Mar. 2011, TS36.214 v10.1.0 (2011-03).
NPL 4: "Issues Regarding Additional Carrier Type in Rel-11 CA", R1-114071, 3GPP TSG-RANWG1 Meeting #67, San Francisco, USA, 14-18 Nov. 2011.

SUMMARY OF INVENTION

Technical Problem

However, the transmission timings of various uplink physical channels are each configured to be implicit or explicit. In a communication system that conducts dynamic time-division duplexing (DTDD), subframes able to switch between being uplink subframes and downlink subframes are configured. For this reason, in such subframes, a problem arises in that signals transmitted from each of the base station device and the terminal device interfere with each other, and appropriate communication cannot be conducted.

The present invention was devised in light of the above problem, and an objective thereof is to provide a terminal device, a method, and an integrated circuit enabling appropriate transmitted power control.

Solution to Problem (1) The present invention has been devised to solve the problems discussed above, and a terminal device according to an aspect of the present invention is a terminal device that communicates with a base station device, including: a reception unit that receives information related to a first configuration and/or information related to a second configuration, and a grant; and a transmission unit that, in a case of an uplink signal being scheduled based on the grant, transmits the uplink signal to the base station device in an earliest uplink subframe on or after a designated subframe from a subframe in which the grant was detected, wherein in a case of both the first configuration and the second configuration being configured, if the grant is a first grant, the transmission unit configures a transmit power of the uplink signal based on a first uplink power control method if the uplink subframe is included in a first subframe subset, configures the transmit power of the uplink signal based on a second uplink power control method if the uplink subframe is included in a second subframe subset, and if the grant is a second grant, the transmission unit configures the transmit power of the uplink signal based on the same uplink power control method, irrespectively of whether the uplink subframe is included in the first subframe subset or the second subframe subset.

(2) Also, a method according to an aspect of the present invention is communication method of a terminal device that communicates with a base station device, including: a step of receiving information related to a first configuration and/or information related to a second configuration, and a grant; a step of transmitting, in a case of an uplink signal being scheduled based on the grant, the uplink signal to the base station device in an earliest uplink subframe on or after a designated subframe from a subframe in which the grant was detected; in a case of both the first configuration and the second configuration being configured, if the grant is a first grant, a step of configuring a transmit power of the uplink signal based on a first uplink power control method if the uplink subframe is included in a first subframe subset, and configuring the transmit power of the uplink signal based on a second uplink power control method if the uplink subframe is included in a second subframe subset; and if the grant is a second grant, a step of configuring the transmit power of the uplink signal based on the same uplink power control method, irrespectively of whether the uplink subframe is included in the first subframe subset or the second subframe subset.

(3) Also, an integrated circuit according to an aspect of the present invention is an integrated circuit mounted onboard a terminal device that communicates with a base station device, and causing the terminal device to exhibit: a function of receiving information related to a first configuration and/or information related to a second configuration, and a grant; a function of transmitting, in a case of an uplink signal being scheduled based on the grant, the uplink signal to the base station device in an earliest uplink subframe on or after a designated subframe from a subframe in which the grant was detected; in a case of both the first configuration and the second configuration being configured, if the grant is a first grant, a function of configuring a transmit power of the uplink signal based on a first uplink power control method if the uplink subframe is included in a first subframe subset, and configuring the transmit power of the uplink signal based on a second uplink power control method if the uplink subframe is included in a second subframe subset; and if the grant is a second grant, a function of configuring the transmit power of the uplink signal based on the same uplink power control method, irrespectively of whether the uplink subframe is included in the first subframe subset or the second subframe subset.

According to the above, a terminal device is able to conduct appropriate transmitted power control.

Advantageous Effects of Invention

According to the present invention, in a communication system in which a base station device and a terminal device communicate, the terminal device conducts appropriate transmitted power control, and thus communication efficiency may be improved.

BRIEF DESCRIPTION OF DRAWINGS

FIG. 3 is a diagram illustrating a configuration of a subframe pattern in a TDD UL/DL configuration.
FIG. 5 is a diagram illustrating an example of TPC command extension.
FIG. 6 is a diagram illustrating another example of TPC command extension.
FIG. 7 is a diagram illustrating an example of parameters included in first information related to uplink power control (UplinkPowerControl).

FIG. 8 is a diagram illustrating an example of common information related to a second uplink power control.

FIG. 9 is a diagram illustrating an example of first dedicated information related to uplink power control and second dedicated information related to uplink power control.

FIG. 10 is a flowchart illustrating a processing procedure of a terminal device 2 according to a basic model of a second embodiment of the present invention.

DESCRIPTION OF EMBODIMENTS (Physical Channels)

Figure 1:
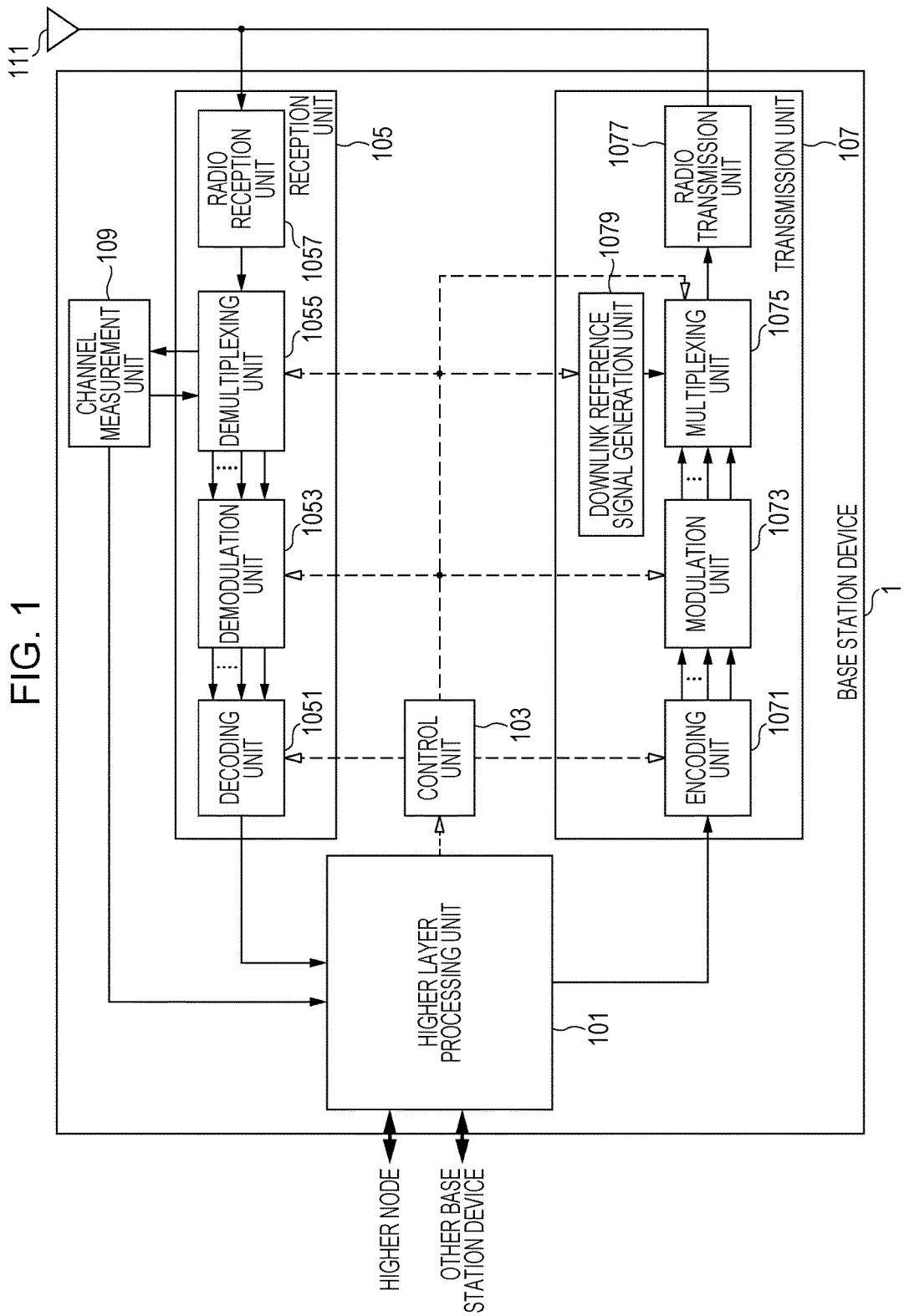
FIG. 1 is a schematic block diagram illustrating a configuration of a base station device 1 according to a first embodiment of the present invention.

The main physical channels (or physical signals) used in LTE and LTE-A will be described. A channel means a medium used to transmit a signal. A physical channel means a physical medium used to transmit a signal. In LTE and LTE-A and subsequent standards releases, there is a possibility that physical channels may be added in the future, or that structural or format changes or additions may be made, but even in such cases, the description of each embodiment of the present invention is unaffected.

In LTE and LTE-A, the scheduling of physical channels is managed using radio frames. One radio frame is 10 ms, and one radio frame is made up of 10 subframes. Furthermore, one subframe is made up of two slots (in other words, one slot is 0.5 ms). Also, scheduling is managed using resource blocks as the smallest units of scheduling in which physical channels are allocated. A resource block is defined by a fixed frequency domain made up of a set of multiple subcarriers (for example, 12 subcarriers) on the frequency axis, and a domain made up of a fixed transmit time interval (for example, one slot, or seven symbols).

Physical channels correspond to sets of resource elements that convey information output from a higher layer. Physical signals are used in the physical layer, and do not convey information output from a higher layer. In other words, higher-layer control information, such as radio resource control (RRC) messages and system information (SI), is transmitted in physical channels.

Downlink physical channels include the physical downlink shared channel (PDSCH), the physical broadcast channel (PBCH), the physical multicast channel (PMCH), the physical control format indicator channel (PCFICH), the physical downlink control channel (PDCCH), the physical hybrid ARQ indicator channel (PHICH), and the enhanced physical downlink control channel (EPDCCH). Also, downlink physical signals include various reference signals and various synchronization signals. The downlink reference signals include the cell-specific reference signal (CRS), the UE-specific reference signal (UERS), and the channel state information reference signal (CSI-RS). The synchronization signals include the primary synchronization signal (PSS) and the secondary synchronization signal (SSS).

Uplink physical channels include the physical uplink shared channel (PUSCH), the physical uplink control channel (PUCCH), and the physical random access channel (PRACH). Also, uplink physical signals include various reference signals. The uplink reference signals include the demodulation reference signal (DMRS) and the sounding reference signal (SRS).

Synchronization signals are made up of three types of primary synchronization signal (PSS) and secondary synchronization signals (SSS) made from 31 types of codes alternately allocated in the frequency domain. The combination of a primary synchronization signal and a secondary synchronization signal indicates a frame timing for radio synchronization with 504 possible cell identifiers (physical layer cell identity (PCI), physical cell identity, physical cell identifier) that identify a base station device. The terminal device 2 specifies the cell identity of a synchronization signal received by cell search.

The physical broadcast channel (PBCH) is transmitted for the purpose of communicating control parameters (broadcast information or system information) shared in common among the terminal devices in the cell. Broadcast information not communicated in the PBCH is communicated by radio resources in the PDCCH, and transmitted in Layer 3 messages (system information (system control information), RRC messages) using the PDSCH. Information communicated as broadcast information includes the cell global identifier (CGI) that indicates an identifier of an individual cell, the tracking area identifier (TAI) that manages a listening area for paging, random access configuration information (such as a transmit timing timer), and common radio resource configuration information (shared radio resource configuration information).

Downlink reference signals are classified into multiple types depending on their purpose. For example, the cell-specific reference signal (CRS) is a pilot signal transmitted at a designated power in each cell, and is a downlink reference signal that is periodically repeated in the frequency domain and the time domain on the basis of a designated rule. The terminal device measures the received signal quality in each cell by receiving the cell-specific reference signal. In addition, the terminal device also uses the downlink cell-specific reference signal as a reference signal for demodulation of the physical downlink control channel transmitted at the same time as the cell-specific reference signal, or the physical downlink shared channel. A sequence identifiable for each cell is used as the sequence used in the cell-specific reference signal. This sequence may also be generated on the basis of a pseudo-random sequence. Also, this sequence may be generated on the basis of a Zadoff-Chu sequence. Also, this sequence may be generated on the basis of a Gold sequence.

In addition, downlink reference signals are also used to estimate downlink propagation channel variation. Downlink reference signals used to estimate propagation channel variation may also be called channel state information reference signals (CSI-RS) or CSI reference signals. Also, in practice, CSI reference signals in which a signal is not sent, or in other words, resources in which the transmission of a signal from the base station device 1 is not conducted, are also called zero power channel state information reference signals (zero power CSI-RS) or zero power CSI reference signals. In addition, downlink resources used to measure the interference component may also be called channel state information-interference measurement resources (CSI-IMR), and the terminal device 2 may use a zero power CSI reference signal included in a CSI-IM resource to measure an interference signal in order to compute the value of the CQI. Additionally, downlink reference signals configured individually for each terminal device 2 are called UE-specific reference signals (UERS), dedicated reference signals, downlink demodulation reference signals (DLDMRS), and the like, and are used for demodulation of the physical downlink control channel or the physical downlink shared channel.

The physical downlink shared channel (PDSCH) is not only used to communicate downlink data, but also to communicate broadcast information (system information) not communicated by paging or in the physical broadcast channel to the terminal device 2 as Layer 3 messages (RRC messages). Radio resource allocation information about the physical downlink shared channel is indicated in the physical downlink control channel. In addition, the PDSCH is also used to communicate parameters (information elements, RRC messages) related to uplink and downlink.

The physical downlink control channel (PDSCH) is transmitted by several OFDM symbols from the beginning of each subframe, and is used for the purpose of informing the terminal device 2 of resource allocation information according to the scheduling of the base station device 1, and an adjustment amount by which to increase or decrease the transmitted power. The terminal device 2 monitors the physical downlink control channel addressed to itself before transmitting or receiving downlink data or Layer 3 messages which are downlink control data (such as paging, handover commands, and RRC messages), and is required to acquire, from the physical downlink control channel, resource allocation information called an uplink grant when transmitting and a downlink grant (also called a downlink assignment) when receiving, by receiving the physical downlink control channel addressed to the terminal device 2 itself. Note that besides being transmitted by the OFDM symbols discussed above, the physical downlink control channel may also be configured to be transmitted in a domain of dedicated resource blocks allocated to an individual terminal device 2 from the base station device 1. The physical downlink control channel transmitted by a domain of dedicated resource blocks allocated to an individual terminal device 2 from the base station device 1 is called the enhanced PDCCH (EPDCCH) in some cases. Also, the PDCCH transmitted by the OFDM symbols discussed above is called the first control channel in some cases, while the EPDCCH is called the second control channel in some cases. In addition, the resource domain to which the PDCCH may be allocated is called the first control channel domain, while the resource domain to which the EPDCCH may be allocated is called the second control channel domain in some cases. Note that the PDCCH described in the following basically includes the EPDCCH.

The base station device 1 may also transmit the PCFICH, the PHICH, the PDCCH, the EPDCCH, PDSCH, the synchronization signal, and the downlink reference signal in the DwPTS of a special subframe. Also, the base station device 1 may not transmit the PBCH in the DwPTS of a special subframe.

Additionally, the terminal device 2 may transmit the PRACH and the SRS in the UpPTS of a special subframe. Also, the terminal device 2 may not transmit the PUCCH, the PUSCH, and the DMRS in the UpPTS of a special subframe.

In addition, in the case in which a special subframe is made up of only the GP and the UpPTS, the terminal device 2 may also transmit the PUCCH and/or the PUSCH and/or the DMRS in the UpPTS of the special subframe.

Herein, the terminal device 2 monitors the set of PDCCH candidates and/or EPDCCH candidates. Hereinafter, the term PDCCH is taken to include the EPDCCH for the sake of simplicity. A PDCCH candidate refers to a candidate in which the PDCCH may possibly be mapped and transmitted by the base station device 1. Also, a PDCCH candidate is made up of one or multiple control channel elements (CCEs). Also, monitoring means that the terminal device 2 attempts to decode each PDCCH in the set of PDCCH candidates according to all monitored DCI formats.

Herein, the set of PDCCH candidates monitored by the terminal device 2 is also called the search space. The search space is the set of resources that possibly may be used by the base station device 1 to transmit the PDCCH. In the PDCCH area, a common search space (CSS) and a UE-specific search space (USS) are set up (defined, configured).

The CSS is used to transmit downlink control information to multiple terminal devices 2. In other words, the CSS is defined by resources that are shared in common among multiple terminal devices 2. Meanwhile, the USS is used to transmit downlink control information to a certain specific terminal device 2. In other words, the USS is defined by resources that are dedicated to a certain specific terminal device 2.

The terminal device 2 monitors the PDCCH in the CSS and/or USS of the PDCCH area, and detects the PDCCH addressed to itself.

Also, an RNTI assigned to the terminal device 2 by the base station device 1 is used to transmit downlink control information (transmission in the PDCCH). Specifically, cyclic redundancy check (CRC) parity bits are attached to the DCI format (or the downlink control information), and after being attached, the CRC parity bits are scrambled by the RNTI.

The terminal device 2 attempts to decode the DCI format with attached CRC parity bits scrambled by the RNTI, and detects the DCI format with a successful CRC as the DCI format addressed to itself (also called blind decoding). In other words, the terminal device 2 attempts to decode the PDCCH with an accompanying CRC scrambled by the RNTI, and detects the PDCCH with a successful CRC as the PDCCH addressed to itself.

Herein, the RNTI includes the cell-radio network temporary identifier (C-RNTI). The C-RNTI is a unique identifier used for identification in radio resource control (RRC) connection and scheduling. The C-RNTI is used for dynamically scheduled unicast transmission.

The RNTI also includes the temporary C-RNTI. The temporary C-RNTI is an identifier used for the random access procedure. For example, the terminal device 2 may decode DCI formats with an attached CRC scrambled by the temporary C-RNTI only in the common search space.

The physical uplink shared channel (PUSCH) mainly transmits uplink data and uplink control data, but is also capable of including control data such as a downlink received signal quality and an ACK/NACK, and may also be used to communicate not only uplink data but also uplink control information to the base station device 1 as Layer 3 messages. Also, similarly to the case of the downlink, resource allocation information about the physical uplink shared channel is indicated in the physical downlink control channel. Additionally, the PUSCH transmits uplink data with respect to a dynamic scheduling grant. Also, the PUSCH transmits information about the local node related to random access (for example, identification information of the terminal device 2, or message 3) with respect to a random access response grant. Also, in the PUSCH, the parameters used for transmitted power control differ in some cases depending on the type of detected grant.

The physical uplink control channel (PUSCH) is used for the acknowledgement/negative acknowledgement (ACK/NACK) of receiving data transmitted in the physical downlink shared channel and the notification of downlink channel information (channel state information), and for making a scheduling request (SR), which is an uplink resource allocation request (radio resource request). The channel state information (CSI) includes a channel quality indicator (CQI), a precoding matrix indicator (PMI), a precoding type indicator (PTI), and a rank indicator (RI). Each indicator may also be referred to as an indication, but the usage and meaning is the same. Also, the format of the PUCCH may be switched depending on the UCI to transmit. For example, when the UCI is made up of a HARQ ACK and/or an SR, the UCI may be transmitted in the PUCCH using format 1/1a/1b/3. Meanwhile, when the UCI is made up of periodic CSI, the UCI may be transmitted in the PUCCH using format 2.

Uplink reference signals include the demodulation reference signal (DMRS) used by the base station device 1 to demodulate the physical uplink control channel (PUCCH) and/or the physical uplink shared channel (PUSCH), and the sounding reference signal (SRS) used by the base station device mainly for estimating the uplink channel state. In addition, the sounding reference signal includes the periodic sounding reference signal (P-SRS), which is configured by a higher layer to be transmitted periodically, and the aperiodic sounding reference signal (A-SRS), whose transmission is requested by an SRS request included in the downlink control information format. The uplink reference signal is also called the uplink pilot signal or the uplink pilot channel in some cases. In addition, the periodic sounding reference signal is also called the trigger type 0 sounding reference signal (trigger type 0 SRS) in some cases. In addition, the aperiodic sounding reference signal is also called the trigger type 1 sounding reference signal (trigger type 1 SRS) in some cases. Furthermore, in cooperative communication, the aperiodic sounding reference signal may also be separated into a signal particularly suited to uplink channel estimation (for example, a signal called the trigger type 1a SRS in some cases), and a signal used to compensate the downlink channel state (CSI, CQI, PMI, RI) (for example, a signal called the trigger type 1b SRS in some cases). Note that the DMRS is configured in correspondence with each of the PUSCH and the PUCCH. Also, the DMRS is time-multiplexed and transmitted in the same subframe as the PUSCH or the PUCCH.

In addition, for the sounding reference signal, the subframe in which to transmit the sounding reference signal is decided according to information related to the transmit subframe included in the configuration of the sounding reference signal communicated by higher layer signaling. The information related to the transmit subframe may be information configured specifically for a cell (shared information), or information configured specifically for a terminal device (dedicated information). In the information configured specifically for a cell, there is configured a subframe in which is transmitted a sounding reference signal shared in common by all terminal devices 2 within the cell. Also, the information configured specifically for a terminal device includes a subframe offset and a transmission period that forms the subset of the subframe configured specifically for the cell. With this information, the terminal device 2 is able to decide a subframe in which the sounding reference signal may be transmitted (also called the SRS subframe or the SRS transmit subframe in some cases). Also, in the case of transmitting the physical uplink shared channel in the subframe in which the sounding reference signal configured specifically for the cell is transmitted, the terminal device 2 may transmit by puncturing time resources of the physical uplink shared channel corresponding to the number of symbols on which the sounding reference signal is transmitted. In so doing, collisions of the transmission of the physical uplink shared channel and the transmission of the sounding reference signal between terminal devices 2 may be avoided. For a terminal device 2 transmitting the physical uplink shared channel, degraded performance may be prevented. Meanwhile, for a terminal device 2 transmitting the sounding reference signal, channel estimation accuracy may be ensured. Herein, information configured specifically for a terminal device may be configured independently by the periodic sounding reference signal and the aperiodic sounding reference signal. Note that a first uplink reference signal is also called the periodic sounding reference signal (P-SRS) or the trigger type 0 sounding reference signal (trigger type 0 SRS) in some cases. A second uplink reference signal is also called the aperiodic sounding reference signal (A-SRS) or the trigger type 1 sounding reference signal (trigger type 1 SRS) in some cases. The first uplink reference signal is transmitted periodically according to the configured transmit subframe when various parameters are configured by higher layer signaling. Also, the second uplink reference signal is transmitted aperiodically when a transmit request is indicated by a field related to a transmit request for the second uplink reference signal (SRS request) included in the downlink control information format. When an SRS request included in a downlink control information format expresses positive or an index (value) corresponding to positive, the terminal device 2 transmits the A-SRS in the designated transmit subframe. On the other hand, when a detected SRS request expresses negative or an index (value) corresponding to negative, the terminal device 2 does not transmit the A-SRS in the designated subframe. Note that the information configured specifically for a cell is reported using the system information or the dedicated control channel. Meanwhile, the information configured specifically for a terminal device is reported using the common control channel.

The physical random access channel (PRACH) is a channel used to communicate a preamble sequence, and includes a guard time. The preamble sequence is structured so that 64 varieties of sequences are available to express 6-bit information. The physical random access channel is used as a means for the terminal device 2 to access the base station device 1. The terminal device 2 uses the physical random access channel to make a radio resource request when the physical uplink control channel is not configured, or to request the base station device 1 for transmit timing adjustment information (also called a timing advance (TA)) needed to match the uplink transmit timing with the receive timing window of the base station device.

Specifically, the terminal device 2 transmits the preamble sequence using radio resources for the physical random access channel configured by the base station device 1. After receiving transmit timing adjustment information, the terminal device 2 configures a transmit timing timer that counts the time of validity of the transmit timing adjustment information configured commonly by the broadcast information (or configured individually by a Layer 3 message), and the terminal device manages the state of the uplink as a transmit timing adjusted state during the time of validity (while the timer is in timing) of the transmit timing timer, and as a transmit timing non-adjusted state (transmit timing unadjusted state) outside the period of validity (while the timer is stopped). Layer 3 messages are control-plane (C-plane) messages exchanged in the radio resource control (RRC) layer between the terminal device 2 and the base station device 1, and are used in a sense synonymous with RRC signaling or RRC messages. Additionally, RRC signaling is also called higher layer signaling or dedicated signaling in some cases.

The random access procedure includes two random access procedures: the contention-based random access procedure and the non-contention-based random access procedure).

The contention-based random access procedure is random access in which collisions between multiple terminal devices 2 may occur.

Meanwhile, the non-contention-based random access procedure is random access in which collisions between multiple terminal devices 2 do not occur. For example, in the non-contention-based random access procedure, the base station device 1 may allocate a random access preamble to terminal devices 2 so that collisions do not occur.

The random access procedure according to the present embodiment is a contention-based random access procedure. An example of a contention-based random access procedure will be described.

The terminal device 2 acquires the system information block type 2 (SIB2) transmitted by the base station device 1. The SIB2 is a configuration shared in common (common information) among all terminal devices 2 (or multiple terminal devices 2) within a cell. For example, the common configuration includes the PRACH configuration.

The terminal device 2 randomly selects a random access preamble number. Also, the terminal device 2 transmits the random access preamble of the selected number (message 1) to the base station device 1 using the PRACH. The base station device 1 uses the random access preamble to estimate the uplink transmission timing.

The base station device 1 transmits a random access response (message 2) using the PDSCH. The random access response includes multiple pieces of information regarding the random access preamble detected by the base station device 1. For example, the multiple pieces of information include the random access preamble number, the temporary C-RNTI, a timing advance (TA) command, and a random access response grant.

The terminal device 2 transmits uplink data (message 3) in the PUSCH scheduled using the random access response grant (initial transmission). The uplink data includes an identity for identifying the terminal device 2 (the initial UE-Identity or information indicating the C-RNTI).

If decoding of the uplink data fails, the base station device 1 specifies the retransmission of uplink data by using the DCI format with attached CRC parity bits scrambled by the temporary C-RNTI. When the retransmission of uplink data is specified by the DCI format, the terminal device 2 retransmits the same uplink data in the PUSCH scheduled using the DCI format with attached CRC parity bits scrambled by the temporary C-RNTI.

In addition, if the decoding of uplink data fails, the base station device 1 may specify the retransmission of uplink data using the PHICH (NACK). When the retransmission of uplink data is specified by the NACK, the terminal device 2 retransmits the same uplink data in the PUSCH.

By successfully decoding and acquiring the uplink data, the base station device is able to know which terminal device 2 was transmitting the random access preamble and the uplink data. In other words, before the uplink is successfully decoded, the base station device 1 is unable to know which terminal device 2 is transmitting the random access preamble and the uplink data.

In the case of receiving a message 3 including the initial UE-Identity, the base station device 1 transmits a contention resolution identity generated on the basis of the received initial UE-Identity (message 4) to the terminal device 2 using the PDSCH. In the case in which the received contention resolution identity and the transmitted initial UE-Identity match, the terminal device 2 (1) regards contention resolution of the random access preamble as successful, (2) sets the value of the temporary C-RNTI to the C-RNTI, (3) discards the temporary C-RNTI, and (4) regards the random access procedure as successfully completed.

Also, in the case of receiving a message 3 including information indicating the C-RNTI, the base station device 1 transmits the DCI format with attached CRC parity bits scrambled by the received C-RNTI (message 4) to the terminal device 2. In the case of decoding the DCI format with attached CRC parity bits scrambled by the C-RNTI, the terminal device 2 (1) regards contention resolution of the random access preamble as successful, (2) discards the temporary C-RNTI, and (3) regards the random access procedure as successfully completed.

In other words, as part of the contention-based random access procedure, the base station device 1 schedules the PUSCH using the random access response grant.

The terminal device 2 transmits uplink data (message 3) in the PUSCH scheduled using the random access response grant. In other words, as part of the contention-based random access procedure, the terminal device 2 performs transmission in the PUSCH corresponding to the random access response grant.

Additionally, as part of the contention-based random access procedure, the base station device 1 schedules the PUSCH using the DCI format with attached CRC parity bits scrambled by the temporary C-RNTI. Additionally, as part of the contention-based random access procedure, the base station device 1 schedules/specifies transmission in the PUSCH using the PHICH (NACK).

The terminal device 2 transmits (retransmits) uplink data (message 3) in the PUSCH scheduled using the DCI format with attached CRC parity bits scrambled by the temporary C-RNTI. Additionally, in response to receiving the PHICH, the terminal device 2 transmits (retransmits) uplink data (message 3) in the scheduled PUSCH. In other words, as part of the contention-based random access procedure, the terminal device 2 performs transmission in the PUSCH corresponding to the retransmission of the same uplink data (transport block).

Hereinafter, logical channels will be described. Logical channels are used to transmit RRC messages and information elements. Also, logical channels are transmitted by physical channels via transport channels.

The broadcast control channel (BCCH) is a downlink channel used to broadcast system control information. For example, system information and information needed for initial access is transmitted using this channel. The master information block (MIB) and the system information block type 1 (SIB1) are transmitted using this channel.

The common control channel (CCCH) is a channel used to transmit control information between a terminal device that does not have an RRC connection with a network, and a network. For example, UE-specific control information and configuration information is transmitted using this channel.

The dedicated control channel (DCCH) is a channel used to transmit dedicated control information bidirectionally between a terminal device that has an RRC connection, and a network. For example, cell-specific reconfiguration information is transmitted using this channel.

Signaling that uses the CCCH and DCCH may be called RRC signaling in some cases.

Information related to uplink power control may be information configured as broadcast information, information (re)configured as information shared in common among terminal devices 2 within the same cell (shared information), and information (re)configured as dedicated information specific to a terminal device. The terminal device 2 conducts transmit power control on the basis of only the information configured as broadcast information, or on the basis of information configured as broadcast information/shared information and information configured as dedicated information.

Radio resource control configuration shared information may also be communicated as broadcast information (or system information). Also, radio resource control configuration shared information may be communicated as dedicated information (mobility control information).

Information related to the radio resource configuration includes information related to the random access channel (RACH) configuration, information related to the broadcast control channel (BCCH) configuration, information related to the paging control channel (PCCH) configuration, information related to the physical random access channel (PRACH) configuration, information related to the physical downlink shared channel (PDSCH) configuration, information related to the physical uplink shared channel (PUSCH) configuration, information related to the physical uplink control channel (PUCCH) configuration, information related to the sounding reference signal (SRS) configuration, information related to uplink power control, information related to the uplink cyclic prefix length, and the like. The information to be communicated may also differ between the case of information being communicated as broadcast information, and the case of information being communicated as reconfiguration information.

The information elements required to configure the various physical channels/physical signals (such as the PRACH, PUCCH, PUSCH, SRS, UL DMRS, CRS, CSI-RS, PDCCH, PDSCH, PSS/SSS, DL DMRS, PBCH, and PMCH) are made up of shared configuration information that is shared in common among terminal devices 2 within the same cell, and dedicated configuration information that is configured for each terminal device 2. The shared configuration information may also be transmitted by system information. Also, the shared configuration information may be transmitted as dedicated information in the case of reconfiguration.

Information related to parameters of the above physical channels is transmitted to the terminal device 2 using RRC messages. In other words, the terminal device 2 configures the resource allocation and transmit power of each physical channel on the basis of received RRC messages. The RRC messages may be messages related to the broadcast channel, messages related to the multicast channel, messages related to the paging channel, messages related to each downlink channel, messages related to each uplink channel, and the like. Each RRC message may be structured to include information elements (IE). Also, in the information elements, information corresponding to parameters may be configured. Note that RRC messages are also called messages in some cases. Also, a message class is a set of one or more messages. Messages may also include information elements. The information elements may be information elements related to radio resource control, information elements related to security control, information elements related to mobility control, information elements related to measurement, information elements related to Multimedia Broadcast Multicast Service (MBMS), and the like. In addition, information elements may also include subordinate information elements. Information elements may also be configured as parameters. Additionally, information elements may also be defined as control information indicating one or more parameters.

Information elements (IE) are used to specify (indicate, configure) parameters with respect to various channels/signals/information by system information (SI) or dedicated signaling. Also, an information element includes one or more fields. An information element may also be made up of one or more information elements. Note that the fields included in an information element are also called parameters in some cases. In other words, an information element may include one or more types of (one or more) parameters. Also, the terminal device 2 conducts radio resource allocation control, uplink power control, transmit control, and the like, on the basis of various parameters. Additionally, system information may also be defined as information elements.

An information element may also be configured in a field constituting an information element. Additionally, a parameter may be configured in a field constituting an information element.

An RRC message includes one or more information elements. Additionally, RRC messages grouped into a set of multiple RRC messages are called a message class.

Parameters related to uplink transmit power control communicated to the terminal device 2 using system information may be a nominal power for the PUSCH, a nominal power for the PUCCH, a path loss compensation coefficient α, a list of power offsets configured for each PUCCH format, and a power offset of the preamble and message 3.

Furthermore, parameters related to the random access channel communicated to the terminal device 2 using system information may be parameters related to the preamble, parameters related to transmit power control of the random access channel, and parameters related to transmit control of the random access preamble. These parameters are used during first access, or when reconnecting after a radio link failure (RLF) occurs.

Information related to transmit power control (information related to uplink power control, information related to the random access channel) may also be communicated to the terminal device 2 as broadcast information, or communicated to the terminal device 2 as shared information.

(First Embodiment)

Hereinafter, a basic model of a first embodiment of the present invention will be described. The communication system according to the basic model of the first embodiment is equipped with a primary base station device (also called a macro base station device, first base station device, first communication device, serving base station device, anchor base station device, first access point, first point, first transmit point, first receive point, macro cell, first cell, or primary cell), which acts as a base station device 1 (hereinafter, also called an access point, point, transmission point, reception point, cell, serving cell, transmit device, receive device, transmit node, receive node, transmit antenna group, transmit antenna port group, receive antenna group, receive antenna port group, communication device, communication terminal, or eNodeB). Furthermore, the communication system according to the first embodiment may also be equipped with a secondary base station device (also called a remote radio head (RRH), remote antenna, overhang antenna, distributed antenna, second access point, second point, second transmit point, second receive point, reference point, low-power node (LPN), micro base station device, pico base station device, femto base station device, small base station device, local area base station device, phantom base station device, home (indoor) base station device (home eNodeB, home NodeB, HeNB, HNB), second base station device, second communication device, cooperative base station device group, cooperative base station device set, cooperative base station device, micro cell, pico cell, femto cell, small cell, phantom cell, local area, second cell, or secondary cell). Additionally, the communication system according to the first embodiment is equipped with a terminal device 2 (hereinafter also called a mobile station, mobile station device, mobile terminal, receive device, transmit device, receive terminal, transmit terminal, third communication device, receive antenna group, receive antenna port group, transmit antenna group, transmit antenna port group, user device, or user equipment (UE)). Herein, the secondary base station device may also be illustrated as multiple secondary base station devices. For example, the primary base station device and the secondary base station device may communicate with the terminal device by using a heterogeneous network deployment, in which some or all of the coverage of the secondary base station device is included in the coverage of the primary base station device.

Additionally, the communication system according to the basic model of the first embodiment is made up of a base station device 1 and a terminal device 2. A single base station device 1 may also manage one or more terminal devices 2. Additionally, a single base station device 1 may also manage one or more cells (serving cell, primary cell, secondary cell, femto cell, pico cell, small cell, phantom cell). Additionally, a single base station device 1 may also manage one or more frequency bands (component carriers, carrier frequencies). Additionally, a single base station device 1 may also manage one or more low-power nodes (LPNs). Additionally, a single base station device 1 may also manage one or more home (indoor) base station devices (home eNodeB (HeNB)). Additionally, a single base station device 1 may also manage one or more access points. Base station devices 1 may also be connected to each other in a wired manner (optical fiber, copper cable, coaxial cable) or in a wireless manner (X2 interface, X3 interface). Additionally, multiple base station devices may be managed by a network. Additionally, a single base station device 1 may also manage one or more relays.

In addition, the communication system according to the basic model of the first embodiment may also realize coordination multiple points (CoMP) with multiple base station devices, low-power base station devices, or home base station devices.

In addition, multiple low-power nodes or small cells deployed nearby may also be clustered (grouped). Multiple clustered low-power nodes may also communicate the same configuration information. Also, the region (coverage) of clustered small cells is called a local area in some cases.

During downlink transmission, the base station device 1 is also called the transmission point (TP) in some cases. Additionally, during uplink transmission, the base station device 1 is also called the reception point (RP) in some cases. Additionally, the downlink transmission point and the uplink reception point may become a path loss reference point (reference point) for downlink path loss measurement. Additionally, the reference point for path loss measurement may also be configured independently from the transmission point and the reception point.

In addition, a small cell, phantom cell, or local area cell may also be configured as a third cell. Additionally, a small cell, phantom cell, or local area cell may also be reconfigured as a primary cell. Additionally, a small cell, phantom cell, or local area cell may also be reconfigured as a secondary cell. A small cell, phantom cell, or local area cell may also be reconfigured as a serving cell. Additionally, a small cell, phantom cell, or local area cell may also be included in a serving cell.

In addition, some physical channels/physical signals do not have to be transmitted in a small cell, a serving cell configured as a small cell, or a component carrier corresponding to a small cell. For example, the cell-specific reference signal(s) (CRS) and the physical downlink control channel (PDCCH) do not have to be transmitted. In addition, new physical channels/physical signals may also be transmitted in a small cell, a serving cell configured as a small cell, or a component carrier corresponding to a small cell.

In the basic model of the first embodiment, the base station device 1 transmits, to the terminal device 2, information related to the first configuration and/or information related to the second configuration. The terminal device 2, in the case of receiving information related to the first configuration or information related to the second configuration (that is, the one of either the information related to the first configuration or the information related to the second configuration is configured), conducts a first uplink power control (first uplink power control method, first uplink power control procedure, first uplink power control process). The terminal device 2, in the case of receiving information related to the first configuration and information related to the second configuration (that is, the information related to the first configuration and the information related to the second configuration are configured), conducts a first uplink power control or a second uplink power control (second uplink power control method, second uplink power control procedure, second uplink power control process), depending on the situation. For example, to conduct the second uplink power control, the terminal device 2 needs to receive information related to the second uplink power control in some cases. Also, the terminal device 2 conducts the second uplink power control in the case of judging that the second uplink power control is available. For example, when information related to the second uplink power control is transmitted from the base station device 1, the terminal device 2 conducts the second uplink power control, whereas when information related to the second uplink power control is not transmitted from the base station device 1, the terminal device 2 does not conduct the second uplink power control. In this case, the terminal device 2 configures the transmit power of the uplink signal on the basis of the first uplink power control.

FIG. 1 is a schematic block diagram illustrating a configuration of a base station device 1 of the present invention. As illustrated in the drawing, the base station device 1 includes a higher layer processing unit 101, a control unit 103, a reception unit 105, a transmission unit 107, a channel measurement unit 109, and a transceiving antenna 111. In addition, the reception unit 105 includes a decoding unit 1051, a demodulation unit 1053, a demultiplexing unit 1055, and a radio reception unit 1057. Also, the reception process of the base station device 1 is conducted by the higher layer processing unit 101, the control unit 103, the reception unit 105, and the transceiving antenna 111. In addition, the transmission unit 107 includes an encoding unit 1071, a modulation unit 1073, a multiplexing unit 1075, a radio transmission unit 1077, and a downlink reference signal generation unit 1079. Also, the transmission process of the base station device 1 is conducted by the higher layer processing unit 101, the control unit 103, the transmission unit 107, and the transceiving antenna 111.

The higher layer processing unit 101 conducts processing in the medium access control (MAC) layer, the packet data convergence protocol (PDCP) layer, the radio link control (RLC) layer, and the radio resource control (RRC) layer.

The higher layer processing unit 101 generates, or acquires from a higher node, information to map to each downlink channel, and outputs the information to the transmission unit 107. Additionally, from among the uplink radio resources, the higher layer processing unit 101 allocates radio resources in which the terminal device 2 will map the physical uplink shared channel (PUSCH), which is uplink data information. Additionally, from among the downlink radio resources, the higher layer processing unit 101 decides radio resources in which to map the physical downlink shared channel (PDSCH), which is downlink data information. The higher layer processing unit 101 generates downlink control information indicating the allocation of the relevant radio resources, and transmits the downlink control information to the terminal device 2 via the transmission unit 107. When allocating the radio resources in which to map the PUSCH, the higher layer processing unit 101 prioritizes the allocation of radio resources with good channel quality, on the basis of uplink channel measurement results input from the channel measurement unit 109. In other words, the higher layer processing unit 101 configures information related to the configuration of various downlink signals and information related to the configuration of various uplink signals with respect to a terminal device or a cell. Additionally, the higher layer processing unit 101 may also configure information related to the configuration of various downlink signals and information related to the configuration of various uplink signals for each cell. Additionally, the higher layer processing unit 101 may also configure information related to the configuration of various downlink signals and information related to the configuration of various uplink signals for each terminal device. Additionally, the higher layer processing unit 101 may also configure information related to a first configuration to information related to an n-th configuration (where n is a natural number) with respect to the terminal devices 2 or a cell, or in other words, uniquely for each terminal device and/or uniquely for each cell, and transmit the information to the terminal device 2 via the transmission unit 107. For example, the information related to the configuration of a downlink signal and/or an uplink signal may include parameters related to resource allocation. Additionally, the information related to the configuration of a downlink signal and/or an uplink signal may also include parameters to use for sequence computation. Note that these radio resources may also be called time-frequency resources, subcarriers, resource elements (RE), resource element groups (REG), control channel elements (CCE), resource blocks (RB), resource block groups (RBG), and the like in some cases.

This configuration information and control information may also be defined as information elements. Additionally, this configuration information and control information may also be defined as RRC messages. Additionally, this configuration information and control information may also be transmitted to the terminal device 2 by system information. Additionally, this configuration information and control information may also be transmitted to the terminal device 2 by dedicated signaling.

In addition, the higher layer processing unit 101 configures at least one TDD UL/DL configuration (TDD config, tdd-Config, uplink-downlink configuration(s)) in the system information block type 1. A TDD UL/DL configuration may be defined as in FIG. 3. The TDD structure may also be indicated by configuring an index. Furthermore, a second TDD UL/DL configuration may also be configured as a downlink reference. Additionally, multiple types of system information blocks may be prepared. For example, the system information block type 1 includes information elements related to the TDD UL/DL configuration. Also, the system information block type 2 includes information elements related to radio resource control. Note that inside a given information element, parameters related to that information element may also be included as information elements. For example, that which is called a parameter in the physical layer may be defined as an information element in a higher layer.

Note that in the present invention, an identity, identifier, or identification is called an ID (identifier, identification code, identification number). An ID configured uniquely for each terminal (UEID) may be a cell radio network temporary identifier (C-RNTI), a semi-persistent scheduling C-RNTI (SPS C-RNTI), a temporary C-RNTI, a TPC-PUSCH RNTI, a TPC-PUCCH RNTI, or a random value for the purpose of contention resolution. These IDs are used per-cell. These IDs are configured by the higher layer processing unit 101. In addition, the higher layer processing unit 101 configures various identifiers with respect to the terminal device 2, and communicates the identifiers to the terminal device 2 via the transmission unit 107. For example, an RNTI is configured and communicated to the terminal device 2. In addition, a physical cell ID, a virtual cell ID, or an ID corresponding to a virtual cell ID is configured and communicated. For example, an ID corresponding to a virtual cell ID may be an ID uniquely configurable to a physical channel (such as a PUSCH ID, PUCCH ID, scrambling initialization ID, or reference signal ID (RSID)). The physical cell ID or virtual cell ID is sometimes used for sequence generation for physical channels and physical signals.

The higher layer processing unit 101, on the basis of uplink control information (UCI) communicated on the physical uplink control channel (PUCCH) from the terminal device 2, the buffer status communicated from the terminal device 2, and various control information for each terminal device 2 configured by the higher layer processing unit 101 (RRC messages, system information, parameters, information elements), generates control information for controlling the reception unit 105 and the transmission unit 107, and outputs the control information to the control unit 103. Note that the UCI includes at least one of an ACK/NACK, a scheduling request (SR), and channel state information (CSI). Note that the CSI includes at least one of a CQI, a PMI, and an RI.

The higher layer processing unit 101 configures the transmit power of uplink signals (PRACH, PUCCH, PUSCH, UL DMRS, P-SRS, and A-SRS) and parameters related to the transmit power. In addition, the higher layer processing unit 101 transmits the transmit power of downlink signals (such as the CRS, DL DMRS, CSI-RS, PDSCH, and PDCCH/EPDCCH) and parameters related to the transmit power to the terminal device 2 via the transmission unit 107. In other words, the higher layer processing unit 101 transmits information related to uplink and downlink power control to the terminal device 2 via the transmission unit 107. Stated differently, the higher layer processing unit 101 configures information related to the transmit power control of the base station device 1 and the terminal device 2. For example, the higher layer processing unit 101 transmits parameters related to the transmit power of the base station device 1 to the terminal device 2. In addition, the higher layer processing unit 101 transmits parameters related to the maximum transmit power of the terminal device 2 to the terminal device 2. In addition, the higher layer processing unit 101 transmits information related to the transmit power control of various physical channels to the terminal device 2. In addition, the higher layer processing unit 101 configures the transmit power of the terminal device 2 according to information such as information indicating the amount of interference from neighboring base station devices, information indicating the amount of interference being exerted on neighboring base station devices 1 communicated from neighboring base station devices, and the channel quality input from the channel measurement unit 109, so that the PUSCH and the like satisfy a designated channel quality, while also accounting for interference on neighboring base station devices 1, and transmits information indicating these configurations to the terminal device 2 via the transmission unit 107.

Specifically, regarding information shared among terminal devices 2 (shared information related to uplink power control) or information configured as parameters shared among terminal devices 2, the higher layer processing unit 101 transmits nominal powers for each of the PUSCH and the PUCCH ($P_{O\_NOMINAL\_PUSCH}$, $P_{O\_NOMINAL\_PUCCH}$), a path loss compensation coefficient (attenuation coefficient) α, a power offset for message 3, power offsets stipulated for each PUCCH format, and the like as system information. At this point, a power offset of the PUCCH format 3 and a power offset of the PUCCH format 1bCS may also be added and communicated. Additionally, this shared information may also be communicated by RRC messages. Additionally, the higher layer processing unit 101 communicates the UE-specific PUSCH power $P_{O\_UE\_PUSCH}$, whether the delta MCS is enabled or disabled, whether accumulation is enabled or disabled, the UE-specific PUCCH power, the P-SRS power offset, and filter coefficients by RRC messages as information configurable for each terminal device 2 (dedicated information related to uplink power control). At this point, a power offset of the transmit diversity in each PUCCH format and the A-SRS power offset may also be communicated. Note that a discussed herein is used to set a path loss value as well as the transmit power, and is a coefficient expressing the degree to which path loss is compensated, or in other words, a coefficient determining how much to increase or decrease the transmit power according to the path loss (that is, how much to compensate the transmit power). Ordinarily, α takes a value from 0 to 1. If 0, power compensation according to path loss is not conducted. If 1, the transmit power of the terminal device 2 is compensated so that path loss effects do not occur in the base station device 1. This information may also be transmitted to the terminal device 2 as reconfiguration information.

In addition, the higher layer processing unit 101 may also configure the transmit power or parameters related to the transmit power of uplink signals and downlink signals for each terminal device 2. In addition, the higher layer processing unit 101 may also configure the transmit power or parameters related to the transmit power of uplink/downlink signals to be shared in common among terminal devices 2. Information related to these parameters may be transmitted to the terminal device 2 as information related to uplink power control and/or information related to downlink power control.

The higher layer processing unit 101 configures various IDs for various physical channels/physical signals, and outputs information related to the ID configuration to the reception unit 105 and the transmission unit 107 via the control unit 103. For example, the higher layer processing unit 101 configures the value of the RNTI (UEID) that scrambles the CRC included in the downlink control information format. Additionally, the higher layer processing unit 101 may also configure the values of various identifiers such as the cell radio network temporary identifier (C-RNTI), the temporary C-RNTI, the paging RNTI (P-RNTI), the random access RNTI (RA-RNTI), and the semi-persistent scheduling C-RNTI (SPS C-RNTI). Also, the higher layer processing unit 101 configures the values of IDs such as the physical cell ID, the virtual cell ID, and the scramble initialization ID. This configuration information is output to each processing unit via the control unit 103. Additionally, this configuration information may also be transmitted to the terminal device 2 as RRC messages, system information, dedicated information specific to the terminal device, or information elements. Additionally, some RNTIs may also be transmitted using MAC control elements (MAC CE).

The control unit 103, on the basis of the control information from the higher layer processing unit 101, generates control signals that control the reception unit 105 and the transmission unit 107. The control unit 103 outputs the generated control signals to the reception unit 105 and the transmission unit 107, and controls the reception unit 105 and the transmission unit 107.

The reception unit 105, following a control signal input from the control unit 103, demultiplexes, demodulates, and decodes a reception signal received from the terminal device 2 via the transceiving antenna 111, and outputs the decoded information to the higher layer processing unit 101. The radio reception unit 1057 downconverts an uplink signal received via the transceiving antenna 111 to an intermediate frequency (IF), removes unwanted frequency components, controls the amplification level so that the signal level is suitably maintained, conducts quadrature demodulation on the basis of the in-phase components and the quadrature components of the received signal, and converts the quadrature-demodulated analog signal into a digital signal. The radio reception unit 1057 removes portions corresponding to a guard interval (GI) from the converted digital signal. The radio reception unit 1057 applies the fast Fourier transform (FFT) to the signal with the guard interval removed, extracts a signal in the frequency domain, and outputs to the demultiplexing unit 1055.

The demultiplexing unit 1055 demultiplexes the signal input from the radio reception unit 1057 into separate signals such as the PUCCH, the PUSCH, the UL DMRS, and the SRS. Note that this demultiplexing is conducted on the basis of radio resource allocation information decided by the base station device 1 in advance and communicated to each terminal device 2. Also, the demultiplexing unit 1055 compensates the channel of the PUCCH and PUSCH from channel estimation values input from the channel measurement unit 109. In addition, the demultiplexing unit 1055 outputs the demultiplexed UL DMRS and the SRS to the channel measurement unit 109.

The demodulation unit 1053 applies the inverse discrete Fourier transform (IDFT) to the PUSCH, acquires modulation symbols, and for each modulation symbol in the PUCCH and PUSCH, demodulates the received signal using a modulation scheme that is predetermined or communicated in advance by the base station device 1 to the terminal device 2 by the downlink control information, such as binary phase shift keying (BPSK), quadrature phase shift keying (QPSK), 16-quadrature amplitude modulation (16-QAM), or 64-quadrature amplitude modulation (64-QAM).

The decoding unit 1051 decodes the encoded bits of the demodulated PUCCH and PUSCH according to a predetermined coding scheme at a coding rate that is predetermined or communicated in advance by the base station device 1 to the terminal device 2 in the uplink grant (UL grant), and outputs the decoded data information and uplink control information to the higher layer processing unit 101.

The channel measurement unit 109 measures factors such as channel estimation values and channel quality from the uplink demodulation reference signal UL DMRS and the SRS input from the demultiplexing unit 1055, and outputs to the demultiplexing unit 1055 and the higher layer processing unit 101. In addition, the channel measurement unit 109 measures the received power and/or the received quality of a 1st signal to an n-th signal, and outputs to the demultiplexing unit 1055 and the higher layer processing unit 101.

The transmission unit 107, following a control signal input from the control unit 103, generates a reference signal for the downlink (downlink reference signal), encodes and modulates data information and downlink control information input from the higher layer processing unit 101, multiplexes the PDCCH (EPDCCH), PDSCH), and the downlink reference signal, and transmits a downlink signal to the terminal device 2 via the transceiving antenna 111.

The encoding unit 1071 encodes downlink control information and data information input from the higher layer processing unit 101 using turbo codes, convolutional codes, block codes, or the like. The modulation unit 1073 modulates the encoded bits according to a modulation scheme such as QPSK, 16-QAM, or 64-QAM. The downlink reference signal generation unit 1079 generates, as a downlink reference signal, a sequence known to the terminal device 2 and computed according to a predetermined rule on the basis of information such as a cell identity (cell ID, cell identifier, cell identification) for identifying the base station device 1. The multiplexing unit 1075 multiplexes each modulated channel and the generated downlink reference signal.

The radio transmission unit 1077 applies the inverse fast Fourier transform (IFFT) to the multiplexed modulation symbols, conducts modulation according to the OFDM scheme, attaches a guard interval to the OFDM-modulated OFDM symbols, generates a baseband digital signal, converts the baseband digital signal to an analog signal, generates in-phase components and quadrature components of an intermediate frequency from the analog signal, removes excess frequency components from the intermediate frequency band, upconverts the signal of intermediate frequency to a signal of high frequency, removes excess frequency components, amplifies the signal power, outputs to the transceiving antenna 111, and transmits the signal.

Figure 2:
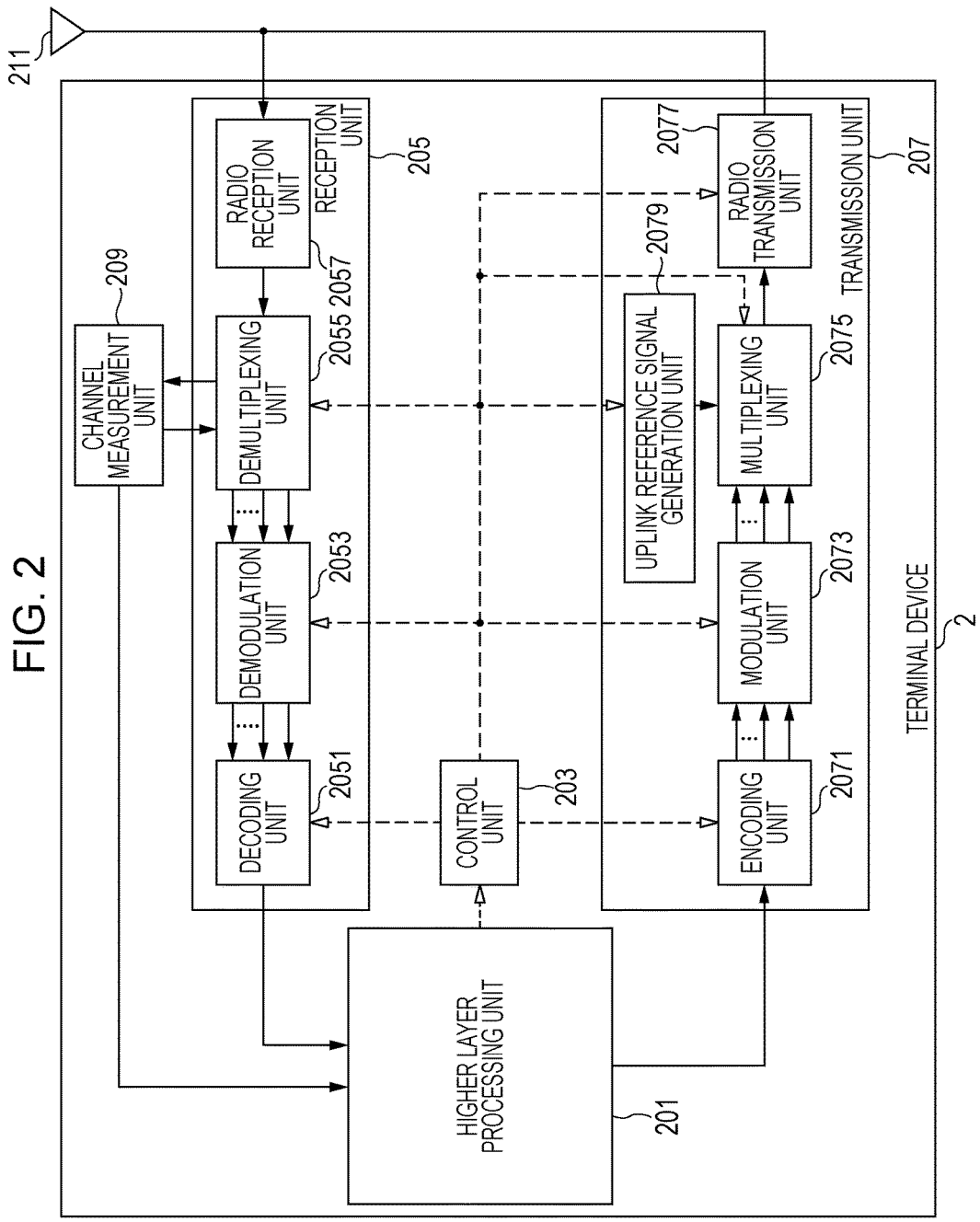
FIG. 2 is a schematic block diagram illustrating a configuration of a terminal device 2 according to a first embodiment of the present invention.

FIG. 2 is a schematic block diagram illustrating a configuration of a terminal device 2 according to the present embodiment. As illustrated in the drawing, the terminal device 2 includes a higher layer processing unit 201, a control unit 203, a reception unit 205, a transmission unit 207, a channel measurement unit 209, and a transceiving antenna 211. In addition, the reception unit 205 includes a decoding unit 2051, a demodulation unit 2053, a demultiplexing unit 2055, and a radio reception unit 2057. The reception process of the terminal device 2 is conducted by the higher layer processing unit 201, the control unit 203, the reception unit 205, and the transceiving antenna 211. In addition, the transmission unit 207 includes an encoding unit 2071, a modulation unit 2073, a multiplexing unit 2075, and a radio transmission unit 2077. Also, the transmission process of the terminal device 2 is conducted by the higher layer processing unit 201, the control unit 203, the transmission unit 207, and the transceiving antenna 211.

The higher layer processing unit 201 outputs uplink data information generated by user operations or the like to the transmission unit. In addition, the higher layer processing unit 201 conducts processing in the medium access control (MAC) layer, the packet data convergence protocol (PDCP) layer, the radio link control (RLC) layer, and the radio resource control (RRC) layer.

The higher layer processing unit 201 manages various configuration information for the local device. In addition, the higher layer processing unit 201 generates information to be mapped to respective uplink channels, and outputs the information to the transmission unit 207. The higher layer processing unit 201 generates control information for controlling the reception unit 205 and the transmission unit 207 on the basis of downlink control information communicated in the PDCCH from the base station device 1, and various configuration information for the local device configured by radio resource control information communicated in the PDSCH and managed by the higher layer processing unit 201, and outputs the control information to the control unit 203. In addition, the higher layer processing unit 201 sets various parameters (information elements, RRC messages) for each signal on the basis of information related to the 1st configuration to information related to the n-th configuration communicated from the base station device 1, and also generates and outputs the set information to the transmission unit 207 via the control unit 203.

The higher layer processing unit 201 acquires, from the reception unit 205, sounding subframes (SRS subframes, SRS transmit subframes), which are subframes that reserve radio resources for transmitting the SRS broadcasted by the base station device 1, information indicating the bandwidth of the radio resources to reserve for transmitting the SRS in the sounding subframes, information indicating the subframe in which to transmit the periodic SRS communicated by the base station device 1 to the terminal device 2, the frequency band, and the amount of cyclic shift to use in the CAZAC sequence of the periodic SRS, and information indicating the frequency band in which to transmit the aperiodic SRS communicated by the base station device 1 to the terminal device 2 and the amount of cyclic shift to use in the CAZAC sequence of the aperiodic SRS.

The higher layer processing unit 201 controls SRS transmission in accordance with the above information. Specifically, the higher layer processing unit 201 controls the transmission unit 207 to transmit, either once or periodically, the periodic SRS in accordance with the information related to the periodic SRS. In addition, when the transmission of the aperiodic SRS is requested in an SRS request (SRS indicator) input from the reception unit 205, the higher layer processing unit 201 transmits the aperiodic SRS a predetermined number of times only (for example, one time) in accordance with the information related to the aperiodic SRS.

The higher layer processing unit 201 controls the transmit power of the PRACH, PUCCH, PUSCH, periodic SRS, and aperiodic SRS on the basis of information related to the transmit power control of various uplink signals transmitted from the base station device 1. Specifically, the higher layer processing unit 201 configures the transmit power of various uplink signals on the basis of various information related to uplink power control acquired from the reception unit 205. For example, the SRS transmit power is controlled on the basis of $P_{0\_PUSCH}$, $\alpha$, the power offset $P_{SRS\_OFFSET}(0)$ for the periodic SRS (first power offset (pSRS-Offset)), the power offset $P_{SRS\_OFFSET}(1)$ for the aperiodic SRS (second power offset (pSRS-OffsetAp)), and TPC commands. Note that the higher layer processing unit 201 switches $P_{SRS\_OFFSET}$ between the first power offset and the second power offset according to whether the SRS is the periodic SRS or the aperiodic SRS. Additionally, when a third power offset is configured for the periodic SRS and/or the aperiodic SRS, the higher layer processing unit 201 sets the transmit power on the basis of the third power offset. Note that the value of the third power offset may be configured over a wider range than the first power offset and the second power offset. The third power offset may also be configured for each of the periodic SRS and the aperiodic SRS. In other words, the information related to uplink power control refers to parameters (information elements, RRC messages) related to the control of the transmit power of various uplink physical channels.

In addition, if the total of the transmit power of the first uplink reference signal and the transmit power of the physical uplink shared channel in a given serving cell or a given subframe exceeds a maximum transmit power (for example, $P_{CMAX}$) configured in the terminal device 2, the higher layer processing unit 201 outputs instruction information to the transmission unit 207 via the control unit 203 so that the physical uplink shared channel is transmitted. In addition, if the total of the transmit power of the first uplink reference signal and the transmit power of the physical uplink control channel in a given serving cell or a given subframe exceeds the maximum transmit power configured in the terminal device 2, the higher layer processing unit 201 outputs instruction information to the transmission unit 207 via the control unit 203 so that the physical uplink control channel is transmitted.

In addition, if the total of the transmit power of the second uplink reference signal and the transmit power of the physical uplink shared channel in a given serving cell or a given subframe exceeds the maximum transmit power configured in the terminal device 2, the higher layer processing unit 201 outputs instruction information to the transmission unit 207 via the control unit 203 so that the physical uplink shared channel is transmitted. In addition, if the total of the transmit power of the second uplink reference signal and the transmit power of the physical uplink control channel in a given serving cell (for example, a serving cell c) or a given subframe (for example, a subframe i) exceeds the maximum transmit power configured in the terminal device 2, the higher layer processing unit 201 outputs instruction information to the transmission unit 207 via the control unit 203 so that the physical uplink control channel is transmitted.

In addition, if the transmission of multiple physical channels at the same timing (for example, subframe) occurs, the higher layer processing unit 201 may control the transmit power of the various physical channels or control the transmission of the various physical channels according to priority levels of the various physical channels. The higher layer processing unit 201 outputs such control information to the transmission unit 207 via the control unit 203.

In addition, in the case of conducting carrier aggregation using multiple serving cells or multiple component carriers corresponding to each of multiple serving cells, the higher layer processing unit 201 may control the transmit power of the various physical channels or control the transmission of the various physical channels according to priority levels of the various physical channels. Additionally, the higher layer processing unit 201 may also perform transmission control of various physical channels transmitted from a cell according to a priority level of that cell. The higher layer processing unit 201 outputs such control information to the transmission unit 207 via the control unit 203.

The higher layer processing unit 201 outputs instruction information to the transmission unit 207 via the control unit 203 so that the generation of the uplink reference signal and the like is conducted on the basis of information related to the configuration of the uplink reference signal communicated from the base station device 1. In other words, a reference signal control unit 2013 outputs, via the control unit 203, information related to the configuration of the uplink reference signal to an uplink reference signal generation unit 2079.

The control unit 203, on the basis of the control information from the higher layer processing unit 201, generates control signals that control the reception unit 205 and the transmission unit 207. The control unit 203 outputs the generated control signals to the reception unit 205 and the transmission unit 207, and controls the reception unit 205 and the transmission unit 207.

The reception unit 205, following a control signal input from the control unit 203, demultiplexes, demodulates, and decodes a receive signal received from the base station device 1 via the transceiving antenna 211, and outputs the decoded information to the higher layer processing unit 201.

The reception unit 205 conducts an appropriate reception process according to whether or not the information related to the first configuration and/or the information related to the second configuration is received. For example, if one of either the information related to the first configuration or the information related to the second configuration is received, a first control information field is detected from the received downlink control information format, whereas if the information related to the first configuration and the information related to the second configuration are received, a second control information field is detected from the received downlink control information format.

The radio reception unit 2057 downconverts a downlink signal received via each receive antenna to an intermediate frequency, removes unwanted frequency components, controls the amplification level so that the signal level is suitably maintained, conducts quadrature demodulation on the basis of the in-phase components and the quadrature components of the received signal, and converts the quadrature-demodulated analog signal into a digital signal. The radio reception unit 2057 removes a portion corresponding to the guard interval from the converted digital signal, applies the fast Fourier transform to the signal with the guard interval removed, and extracts a signal in the frequency domain.

The demultiplexing unit 2055 demultiplexes the extracted signal into each of the physical downlink control channel (PDCCH), the PDSCH, and the downlink reference signal (DRS). Note that this demultiplexing is conducted on the basis of radio resource allocation information and the like communicated by the downlink control information. Also, the demultiplexing unit 2055 compensates the channel of the PDCCH and PDSCH from channel estimation values input from the channel measurement unit 209. In addition, the demultiplexing unit 2055 outputs the demultiplexed downlink reference signal to the channel measurement unit 209.

The demodulation unit 2053 demodulates the PDCCH according to a QPSK modulation scheme, and outputs to the decoding unit 2051. The decoding unit 2051 tests the decoding of the PDCCH, and if decoding is successful, outputs the decoded downlink control information to the higher layer processing unit 201. The demodulation unit 2053 demodulates the PDSCH according to a demodulation scheme communicated by the downlink control information, such as QPSK, 16-QAM, or 64-QAM, and outputs to the decoding unit 2051. The decoding unit 2051 decodes at the coding rate communicated by the downlink control information, and outputs the decoded data information to the higher layer processing unit 201.

The channel measurement unit 209 measures the downlink path loss from the downlink reference signal input from the demultiplexing unit 2055, and outputs the measured path loss to the higher layer processing unit 201. In addition, the channel measurement unit 209 computes downlink channel estimation values from the downlink reference signal, and outputs to the demultiplexing unit 2055. In addition, the channel measurement unit 209 measures the received power and measures the received quality of the first signal and/or the second signal in accordance with various information related to measurements and various information related to measurement reports communicated from the reference signal control unit 2013 via the control unit 203. The results are output to the higher layer processing unit 201. Additionally, when instructed to perform a channel evaluation of the first signal and/or the second signal, the channel measurement unit 209 may output results related to a channel evaluation of each signal to the higher layer processing unit 201. Herein, the first signal and the second signal are a reference signal (pilot signal, pilot channel, standard signal), and besides the first signal and the second signal, there may also be a third signal and a fourth signal. In other words, the channel measurement unit 209 measures the channel of one or more signals. In addition, the channel measurement unit 209 configures the signal for which to conduct channel measurement in accordance with control information communicated from the higher layer processing unit 201 via the control unit 203.

The transmission unit 207, following a control signal (control information) input from the control unit 203, generates the uplink demodulation reference signal (UL DMRS) and/or the sounding reference signal (SRS), encodes and modulates data information input from the higher layer processing unit 201, multiplexes the PUCCH, PUSCH, and the generated UL DMRS and/or SRS, adjusts the transmit power of the PUCCH, PUSCH, UL DMRS, and SRS, and transmits to the base station device 1 via the transceiving antenna 211. Also, when information related to a measurement result is output from the higher layer processing unit 201, the transmission unit 207 transmits the relevant information to the base station device 1 via the transceiving antenna 211. Also, when channel state information, which is a result related to channel evaluation, is output from the higher layer processing unit 201, the transmission unit 207 feeds back the channel state information to the base station device 1. In other words, the higher layer processing unit 201 generates channel state information (CSI, CQI, PMI, RI) on the basis of a measurement result communicated from the channel measurement unit 209, and feeds back the generated channel state information to the base station device 1 via the control unit 203. When a designated grant (or a designated downlink control information format) is detected in the reception unit, the transmission unit 207 transmits an uplink signal corresponding to the designated grant in the first uplink subframe on or after a designated subframe from the subframe in which the grant was detected. For example, if a grant is detected in subframe i, an uplink signal may be transmitted in the first uplink subframe on or after subframe i+k.

In addition, when the transmission subframe of an uplink signal is the subframe i, the transmission unit 207 configures the transmit power of the uplink signal using a transmit power control command received in the subframe i-k.

In the case of receiving and configuring one of either the information related to the first configuration or the information related to the second configuration in the reception unit 205, the transmission unit 207 conducts the first uplink power control, whereas in the case of receiving and configuring the information related to the first configuration and the information related to the second configuration in the reception unit 205, the transmission unit 207 conducts the second uplink power control, and transmits the uplink signal.

The encoding unit 2071 encodes uplink control information and data information input from the higher layer processing unit 201 using turbo codes, convolutional codes, block codes, or the like. The modulation unit 2073 modulates the encoded bits input from the encoding unit 2071 according to a modulation scheme such as BPSK, QPSK, 16-QAM, or 64-QAM.

The uplink reference signal generation unit 2079 generates the uplink reference signal on the basis of information related to the configuration of the uplink reference signal. In other words, the uplink reference signal generation unit 2079 generates a CAZAC sequence known to the base station device 1 and computed according to a predetermined rule on the basis of information such as a cell identity for identifying the base station device 1, the uplink demodulation reference signal, and the bandwidth in which to map the first uplink reference signal and the second uplink reference signal. Additionally, the uplink reference signal generation unit 2079, following a control signal input from the control unit 203, applies a cyclic shift to the generated CAZAC sequences of the uplink demodulation reference signal, the first uplink reference signal, and the second uplink reference signal.

The uplink reference signal generation unit 2079 may also initialize the uplink demodulation reference signal and/or the sounding reference signal, and the base sequence of the uplink reference signals on the basis of designated parameters. The designated parameters may be the same parameters for each reference signal. Also, the designated parameters may be parameters configured individually for each reference signal. In other words, if there are not individually configured parameters, the uplink reference signal generation unit 2079 may initialize the base sequence of each reference signal with the same parameters.

The multiplexing unit 2075, following a control signal input from the control unit 203, reorders the PUSCH modulation symbols in parallel, applies the discrete Fourier transform (DFT), and multiplexes the PUSCH and PUSCH signals with the generated UL DMRS and SRS.

The radio transmission unit 2077 applies the inverse fast Fourier transform to the multiplexed signal, conducts modulation according to the SC-FDMA scheme, attaches a guard interval to the SC-FDMA modulated SC-FDMA symbols, generates a baseband digital signal, converts the baseband digital signal to an analog signal, generates in-phase components and quadrature components of an intermediate frequency from the analog signal, removes excess frequency components from the intermediate frequency band, upconverts the signal of intermediate frequency to a signal of high frequency (radio frequency), removes excess frequency components, amplifies the signal power, outputs to the transceiving antenna 211, and transmits the signal.

Figure 4:
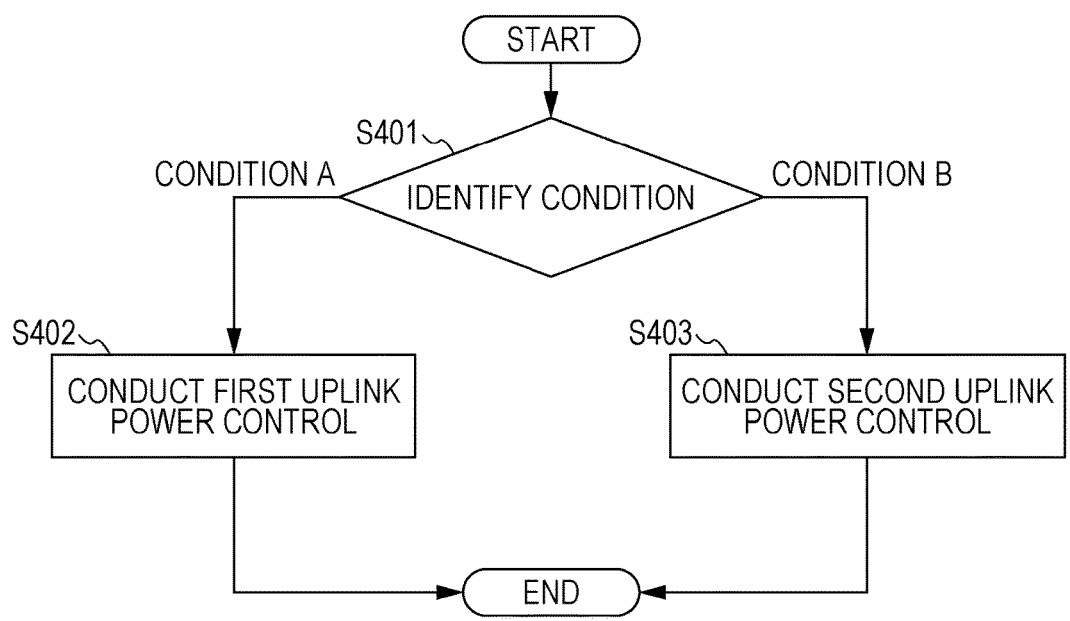
FIG. 4 is a flowchart illustrating a processing procedure of a terminal device 2 according to a basic model of a first embodiment of the present invention.

FIG. 4 is a flowchart illustrating a processing procedure of the terminal device 2 according to a basic model of the first embodiment. The terminal device 2 identifies whether a condition A is satisfied or a condition B is satisfied, according to information transmitted from the base station device 1 (step S401). If the condition A is satisfied, the terminal device 2 conducts the first uplink power control (step S402). If the condition B is satisfied, the terminal device 2 conducts the second uplink power control (step S403). Herein, the first uplink power control and the second uplink power control are applied to all uplink subframes.

Herein, the condition A is that the terminal device 2 receives and configures only one of either the information related to the first configuration information or the information related to the second configuration, whereas the condition B is that the terminal device 2 receives and configures the information related to the first configuration and the information related to the second configuration.

Note that the first uplink power control and the second uplink power control will be described using the modifications discussed later.

Note that the information related to the first configuration and the information related to the second configuration will be discussed in detail later.

In the first embodiment, by associating given information with uplink power control, transmit power control may be conducted appropriately depending on the communication conditions.

(Modification 1 of First Embodiment)

Next, Modification 1 of the first embodiment will be described. In Modification 1 of the first embodiment, the base station device 1 transmits, to the terminal device 2, the information related to the first configuration and/or the information related to the second configuration. Additionally, the base station device 1 may configure and transmit a field related to a first transmit power control (TPC) command in the downlink control information (DCI) format to the terminal device 2 that configures only one of either the information related to the first configuration or the information related to the second configuration. Additionally, the base station device 1 may configure and transmit a field related to a second TPC command in the DCI format to the terminal device 2 that configures the information related to the first configuration and the information related to the second configuration. In the case of receiving the information related to the first configuration or the information related to the second configuration, the terminal device 2 conducts a reception process (for example, demodulation and decoding process, signal detection process, information extraction process) treating a field related to a TPC command accompanying the DCI format transmitted from the base station device 1 as the field related to the first TPC command, and conducts transmit power control of the uplink signal on the basis of the first TPC command. In the case of receiving the information related to the first configuration and the information related to the second configuration, the terminal device 2 conducts a reception process treating the field related to a TPC command accompanying the DCI format transmitted from the base station device 1 as the field related to the second TPC command, and conducts transmit power control of the uplink signal on the basis of the second TPC command.

Described in terms of the basic model of the first embodiment, the difference between the first uplink power control and the second uplink power control herein may be whether or not a field related to a transmit power control (TPC) command included in the downlink control information (DCI) format is extended. In other words, the bit size (number of bits) constituting the field related to a TPC command is different between the first uplink power control and the second uplink power control. For example, the field related to a TPC command is made up of 2 bits in the first uplink power control, but made up of 3 bits in the second uplink power control. In other words, if the information related to the second configuration is configured, the terminal device 2 recognizes the field related to a TPC command as being extended, conducts a demodulation and decoding process, and conducts uplink power control. If the field related to a TPC command is extended, the terminal device 2 may dynamically control power correction over a wider range than before extension. Note that the bit sizes indicated herein are one example, and extension using bit sizes different from this example is also possible.

In addition, in Modification 1 of the first embodiment, if the information related to the first configuration and the information related to the second configuration are configured, the terminal device 2 may recognize that the field related to a transmit power control (TPC) command is extended. Herein, extension of the field related to a TPC command includes extension of the number of bits allocated to the field related to a TPC command. Additionally, extension of the field related to a TPC command includes becoming able to configure the configurable power correction value to a higher value or a lower value compared to the values selectable by the TPC command before extension. In other words, the number of bits constituting the field related to a TPC command does not change, but the configurable values change. Note that the information related to the first configuration and the information related to the second configuration may also be set in the same RRC message (or system information) and transmitted to the terminal device 2. Additionally, the information related to the first configuration and the information related to the second configuration may be set in different RRC messages (or system information) and transmitted to the terminal device 2. Also, the information related to the first configuration and the information related to the second configuration are set as different information elements (parameters). In other words, if the information related to the first configuration and the information related to the second configuration are configured, the terminal device 2 may demodulate and decode an extended field related to a TPC command, and extend the range of uplink power control. In other words, the terminal device 2 may perform power correction over a wider (greater) range dynamically in units of subframes.

Additionally, in the terminal device 2, a table related to the first TPC command and a table related to the second TPC command may be configured in advance. FIGS. 5 and 6 are examples of the structures of TPC commands specified by the field related to the first TPC command and the field related to the second TPC command. FIG. 5 illustrates the case in which the bit size (number of bits) is extended between the field related to the first TPC command and the field related to the second TPC command. By extending the bit size, in the field related to the second TPC command, power correction with a greater number of levels may be conducted over a wider range. Meanwhile, in FIG. 6, the field related to the first TPC command and the field related to the second TPC command are structured with the same bit size, but the selectable power correction values are different. At least one configurable power correction value is different between the field related to the first TPC command and the field related to the second TPC command.

In the terminal device 2, when the TPC command is extended as a result of the information related to the first configuration and the information related to the second configuration being configured, the DCI format including the extended TPC command field is mapped to at least one from among the UE-specific search space (USS) of the PDCCH, the common search space (CSS) of the EPDCCH, and the USS of the EPDCCH.

The higher layer processing unit of the base station device 1 may also transmit a DCI format accompanied by an extended TPC command to the terminal device 2 in which the information related to the second configuration is configurable.

In addition, the base station device 1 may also configure the field related to the first TPC command and the field related to the second TPC command in the same DCI format, and transmit the DCI format to the terminal device 2 in which the information related to the first configuration and the information related to the second configuration are configured. In addition, the base station device 1 may also configure the field related to the first TPC command in the same DCI format as the field related to the second TPC command, and transmit the DCI format to the terminal device 2 in which the information related to the first configuration and the information related to the second configuration are configured. In other words, the base station device 1 may also substitute the field related to the first TPC command with the field related to the second TPC command, and transmit. In addition, the base station device 1 may also configure part of the control information field as the second TPC command-related field, and transmit to the terminal device 2 in which the information related to the first configuration and the information related to the second configuration are configured. The terminal device 2 may detect the second TPC command-related field from the DCI format configured by the base station device 1. Note that different control information between the information related to the first configuration and the information related to the second configuration may be used to indicate whether or not the second TPC command may be applied.

(Modification 2 of First Embodiment)

Next, Modification 2 of the first embodiment will be described. In Modification 2 of the first embodiment, the base station device 1 transmits, to the terminal device 2, the information related to the first configuration and/or the information related to the second configuration. Additionally, the base station device 1 may configure a field specifying whether or not to apply a designated power offset to the uplink power in the downlink control information (DCI) format, and transmit the DCI format to the terminal device 2 that configures the information related to the first configuration and the information related to the second configuration. Additionally, the base station device 2 transmits information related to the designated power offset to the terminal device 2 that configures the information related to the first configuration and the information related to the second configuration. In the case of receiving the information related to the first configuration and the information related to the second configuration, the terminal device 2 recognizes that a field specifying whether or not to apply the designated power offset to the uplink power has been added to the DCI format, and conducts a DCI format reception process (demodulation and decoding process, detection process). If the field specifies the application of the designated power offset, the terminal device 2 configures the transmit power of the uplink signal while also accounting for the designated power offset, and transmits the uplink signal to the base station device 1. For example, the designated power offset may be a power ratio of the transmit power of uplink signals transmitted in a first subframe subset and a second subframe subset. Additionally, the designated power offset may also be a power difference of the transmit power of the uplink signal transmitted in a first subframe subset and a second subframe subset. Additionally, the designated power offset is a power ratio of the transmit power configured by the first uplink power control and the transmit power configured by the second uplink power control. Additionally, the designated power offset is a power difference of the transmit power configured by the first uplink power control and the transmit power configured by the second uplink power control. Also, when the designated power offset is 0, the transmit power configured by the first uplink power control and the transmit power configured by the second uplink power control may become the same in some cases.

Described in terms of the basic model of the first embodiment, when information related to the designated power offset is configured in the terminal device 2, the difference between the first uplink power control and the second uplink power control may be whether or not a field specifying whether or not to apply the designated power offset to the uplink power is added to the DCI format. In other words, if the terminal device 2 configures the information related to the second configuration in addition to the information related to the first configuration, the terminal device 2 recognizes that a field specifying whether or not to apply the designated power offset to the uplink power has been added to the DCI format, and conducts the reception process. When the application of the designated power offset to the uplink power is specified, the terminal device 2 configures the uplink power while accounting for the designated power offset. Note that the designated power offset may also be communicated to the terminal device 2 by being included in an RRC message (information element), and in this case, the field is configured as 1-bit on-off trigger bit. Additionally, the degree of offset in the designated power offset may also be configured by the field specifying whether or not to apply the designated power offset to the uplink power. In other words, a new field related to uplink power control is added to the DCI format. The DCI format configured with the new field is allocated to at least one of the PDCCH, the USS of the EPDCCH, or the CSS of the EPDCCH.

(Modification 3 of First Embodiment)

Next, Modification 3 of the first embodiment will be described. In Modification 3 of the first embodiment, the base station device 1 transmits, to the terminal device 2, the information related to the first configuration and/or the information related to the second configuration. Additionally, the base station device 1 may configure a field specifying a switch between information related to the first uplink power control and information related to the second uplink power control in the downlink control information (DCI) format, and transmit the DCI format to the terminal device 2 that configures the information related to the first configuration and the information related to the second configuration. When the field specifies the application of the information related to the first uplink power control, the base station device 1 may control the terminal device 2 so that the transmit power of the uplink signal is configured on the basis of the information related to the first uplink power control, whereas when the field specifies information related to the second uplink power control, the base station device 1 controls the terminal device 2 so that the transmit power of the uplink signal is configured on the basis of the information related to the second uplink power control. In the case of receiving the information related to the first configuration and the information related to the second configuration, the terminal device 2 recognizes that a field specifying a switch between information related to the first uplink power control and information related to the second uplink power control is configured in the DCI format transmitted from the base station device 1, conducts a reception process, and controls the transmit power of the uplink signal on the basis of the specification by that field. Note that when the field is made up of 2 bits or more, switching among information related to multiple types of uplink power control may be specified. For example, when the field is made up of 2 bits, if a first value (for example, "00") is indicated, the transmit power of the uplink signal is configured on the basis of information related to the first uplink power control, while if a second value (for example, "01") is indicated, the transmit power of the uplink signal is configured on the basis of information related to the second uplink power control. If a third value (for example, "10") is indicated, the transmit power of the uplink signal is configured on the basis of information related to a third uplink power control, and if a fourth value (for example, "11") is indicated, the transmit power of the uplink signal is configured on the basis of information related to a fourth uplink power control. In this case, the information related to the first uplink power control through the information related to the fourth uplink power control is configured in advance. Note that the information related to the first uplink power control through the information related to the fourth uplink power control may also be communicated from the base station device 1 to the terminal device 2 by RRC message.

Described in terms of the basic model of the first embodiment, when information related to the first uplink power control and information related to the second uplink power control is configured in the terminal device 2, the difference between the first uplink power control and the second uplink power control to be conducted as a result of the information related to the first configuration and/or the information related to the second configuration being configured may be whether or not a field specifying a switch between the information related to the first uplink power control and the information related to the second uplink power control is added to the DCI format. In other words, in the second uplink power control, a field specifying a switch between two pieces of information related to uplink power control is configured in the DCI format. When the value configured in the field specifying a switch of information related to uplink power control is a first value (first index), the uplink transmit power is configured on the basis of the information related to the first uplink power control, whereas when the value configured in the field specifying a switch of information related to uplink power control is a second value (second index), the uplink transmit power is configured on the basis of the information related to the second uplink power control. The base station device 1 transmits the information related to the first uplink power control and the information related to the second uplink power control to the terminal device 2. Note that the information related to uplink power control includes at least one power control parameter related to an uplink signal (uplink physical channel). Additionally, when the terminal device 2 has not configured the information related to the second uplink power control, the terminal device 2 does not recognize that a field specifying a switch between the information related to the first uplink power control and the information related to the second uplink power control is added to the DCI format, even if the information related to the first configuration and the information related to the second configuration are configured. Also, if the terminal device 2 is configured with only one of the information related to the first uplink power control and the information related to the second uplink power control, the terminal device 2 does not expect to receive the information related to the second configuration.

In this case, the base station device 1 configures multiple pieces of information related to uplink power control in the terminal device 2. The multiple pieces of configured information may be information configured specifically for the cell. Also, the multiple pieces of configured information may be information configured specifically for the terminal device. Also, the multiple pieces of configured information may be information configured specifically for the cell and information configured specifically for the terminal. Also, the multiple pieces of configured information may be specific parameters included in information configured specifically for the cell or information configured specifically for the terminal. For example, the information related to uplink power control includes at least parameter or parameter set for controlling the transmit power of the PUSCH, the transmit power of the PUCCH, or the transmit power of the SRS. In other words, for parameters not configured in the information related to the second uplink power control, the parameters configured in the information related to the first uplink power control may be reused.

For example, the uplink power control that differs between the first uplink power control and the second uplink power control involves controlling the transmit power of an uplink signal by switching different cell-specific parameters (parameter sets) related to uplink power control. Additionally, the different transmit power control involves controlling the transmit power of an uplink signal by switching different UE-specific parameters (parameter sets) related to uplink power control. Additionally, the different transmit power control involves controlling the transmit power of an uplink signal by switching different cell-specific or UE-specific parameters (parameter sets) related to uplink power control. Also, the different uplink power control involves conducting accumulation transmit power control in different loops.

FIG. 7 is a diagram illustrating an example of parameters included in the information related to the first uplink power control (UplinkPowerControl). The information related to the first uplink power control may be information configured specifically for the cell (and shared in common among terminal devices inside the cell) (common information related to uplink power control (UplinkPowerControlCommon)), or information configured for each terminal device (dedicated information related to uplink power control (UplinkPowerControlDedicated)). The common information includes a nominal PUSCH power (p0-NominalPUSCH) which is the PUSCH power configurable specifically for the cell, a fractional transmit power control attenuation coefficient (path loss compensation coefficient) α (alpha), a nominal PUCCH power (p0-NominalPUCCH) which is the PUCCH power configurable specifically for the cell, a power adjustment value (power offset) $\Delta_{F\_PUCCH}$ for each PUCCH format (deltaFList-PUCCH), and a power adjustment value (power offset) for when the preamble message 3 is transmitted (deltaPreambleMsg3). Also, the dedicated information includes a UE-specific PUSCH power (p0-UE-PUSCH) which is the PUSCH power configurable specifically for the terminal device, information specifying whether or not to account for a power adjustment value $K_s$ in the modulation coding scheme (deltaMCS-Enabled), information specifying whether or not accumulation transmit power control is available (accumulationEnabled), a UE-specific PUCCH power (p0-UE-PUCCH) which is the PUCCH power configurable specifically for the terminal device, the power offsets $P_{SRS\_OFFSET}$ of the periodic and aperiodic SRS (pSRS-Offset, pSRS-OffsetAp), and the filter coefficient (filterCoefficient) of the reference signal received power (RSRP). This information is configurable for the primary cell, but may also be configured similarly for a secondary cell. Furthermore, the dedicated information for a secondary cell may also include a parameter (pathlossReferenceLinking) specifying that path loss is to be calculated using a path loss measurement reference signal of the primary cell or secondary cell.

FIG. 8 is a diagram illustrating an example of common information related to the second uplink power control. The parameters included in common information related to uplink power control (for the primary cell) or common information related to uplink power control for a second, secondary cell may be configured including all of the parameters illustrated in FIG. 8. Additionally, the information elements included in common information related to uplink power control (for the primary cell) or common information related to uplink power control for a second, secondary cell may be configured including at least one parameter among the parameters illustrated in FIG. 8. Additionally, the parameters included in common information related to uplink power control (for the primary cell) or common information related to uplink power control for a second, secondary cell may also not include any of the above. In this case, the base station device 1 selects release, and transmits the common information to the terminal 2. Also, parameters not configured in the common information related to the second uplink power control may be configured the same as the common information related to the first uplink power control.

FIG. 9 is a diagram illustrating an example of dedicated information related to the first uplink power control and dedicated information related to the second uplink power control. In the dedicated information related to uplink power control for the first primary cell/secondary cell, a path loss reference resource specifying a downlink reference signal (downlink radio resource) with which to measure path loss may be configured. Also, in the dedicated information related to uplink power control for the second primary cell/secondary cell, the path loss reference resource may be configured in addition to the parameters illustrated in FIG. 7. The parameters included in dedicated information related to uplink power control (for the primary cell) or dedicated information related to uplink power control for a second secondary cell may be configured including all of the parameters illustrated in FIG. 9. Additionally, it is sufficient for the parameters included in dedicated information related to uplink power control (for the primary cell) or dedicated information related to uplink power control for a second secondary cell to be configured including at least one parameter among the parameters illustrated in FIG. 9. Additionally, for the parameters included in dedicated information related to uplink power control (for the primary cell) or dedicated information related to uplink power control for a second, no parameters may be configured. In this case, the base station device 1 selects release, and transmits the information to the terminal device 2. Also, parameters not configured in the dedicated information related to the second uplink power control may be configured the same as the dedicated information related to the first uplink power control. In other words, when a path loss reference resource is not configured in the dedicated information related to the second uplink power control, the path loss calculation may be conducted on the basis of the path loss reference resource configured in the dedicated information related to the first uplink power control.

Note that the information related to the first uplink power control and the information related to the second uplink power control may also be transmitted to the terminal device 2 by being included in the same information element or the same RRC message.

(Modification 4 of First Embodiment)

Next, Modification 4 of the first embodiment will be described. In Modification 4 of the first embodiment, the base station device 1 transmits, to the terminal device 2, the information related to the first configuration and/or the information related to the second configuration. Additionally, the base station device 1 configures and transmits to the terminal device 2 a DCI format 3B specifying an extended TPC command in the DCI format 3/3A. When the information related to the first configuration and the information related to the second configuration are configured, the terminal device 2 may treat the received DCI format 3/3A as the DCI format 3B. When only one of either the information related to the first configuration or the information related to the second configuration is configured, the terminal device 2 may configure the transmit power of the uplink signal on the basis of the DCI format specifying the unextended TPC command, whereas when both the information related to the first configuration and the information related to the second configuration are configured, the terminal device 2 may configure the transmit power of the uplink signal on the basis of the DCI format specifying the extended TPC command.

When the information related to the first configuration and the information related to the second configuration are configured, the terminal device 2 recognizes the TPC command number included in the DCI format 3B, according to the bit size of the extended TPC command. For example, provided that L is the payload size of the DCI format 0, N is the TPC command number, and M is the bit size, the TPC command number configured in the DCI format 3B is computed by N=FLOOR(L/M). In the DCI format 3B, the TPC index is configured independently from the DCI format 3/3A. Note that the DCI format 3B may also be allocated only to the CSS of the EPDCCH. Additionally, the DCI format 3B may also be allocated to the USS of the PDCCH or the EPDCCH.

Described in terms of the basic model of the first embodiment, the difference between the first uplink power control and the second uplink power control is whether or not a new DCI format related to the TPC command is configured. Herein, with respect to the new DCI format related to the extended TPC command (DCI format 3B), an identifier for identifying the DCI format related to the TPC command (TPC-RNTI) may be configured independently from the DCI format 3/3A. Additionally, the TPC index of the DCI format 3B may also be configured independently from the DCI format 3/3A.

In the first embodiment, even if two subframe subsets are formed by the information related to the first configuration and the information related to the second configuration, the terminal device 2 is able to perform transmit power control shared in common between different subframe subsets.

In Modification 1 to Modification 4 of the first embodiment, if the information related to the first configuration and the information related to the second configuration are configured, the terminal device 2 is able to recognize that the DCI format is extended, that a field in part of the DCI format may be read differently, or that a new field (control information field, control field, information bit field, bit field) has been added to the DCI format.

Note that in the first embodiment, when the information related to the first configuration and the information related to the second configuration are configured in the terminal device 2, if the DCI format not configured with the new control information field is designated a first DCI format, and the DCI format configured with the new control information field is designated a second DCI format, the second DCI format may be transmitted in the UE-specific search space (USS) of the PDCCH (first downlink control channel region) and/or the EPDCCH (second downlink control channel region). Additionally, the second DCI format may be transmitted in the common search space (CSS) of the EPDCCH. In other words, even if the information related to the first configuration and the information related to the second configuration are configured in the terminal device 2, the first DCI format is transmitted in the CSS of the PDCCH.

Depending on the information (condition) configured in the terminal device 2, the terminal device 2 may perform appropriate transmit power control by switching the transmit power control of uplink signals, irrespectively of the transmit subframe configuration.

(Basic Model of Second Embodiment)

Next, a basic model of the second embodiment will be described. In the basic model of the second embodiment, the base station device 1 transmits, to the terminal device 2, the information related to the first configuration and/or the information related to the second configuration. When one of either the information related to the first configuration or the information related to the second configuration is configured, the terminal device 2 controls the transmit power of an uplink signal on the basis of the first uplink power control, whereas when the information related to the first configuration and the information related to the second configuration are configured, the terminal device 2 constructs a first subframe subset and a second subframe subset on the basis of the information related to the first configuration and the information related to the second configuration, configures the transmit power of an uplink signal transmitted in an uplink subframe included in the first subframe subset on the basis of the first uplink power control, and configures the transmit power of an uplink signal transmitted in an uplink subframe included in the second subframe subset on the basis of the second uplink power control. Note that the information related to the first configuration and the information related to the second configuration will be discussed in detail later.

FIG. 10 is a flowchart according to the basic model of the second embodiment. The terminal device 2 identifies a first condition (step S1001). In the case of a condition A, the terminal device 2 performs the first uplink power control on all uplink subframes (step S1002). In the case of the condition B, the terminal device 2 additionally identifies a second condition (S1003). In the case of a condition B1, the terminal device 2 performs the first uplink power control on uplink subframes included in the first subframe subset (S1004). In the case of a condition B2, the terminal device 2 performs the second uplink power control on uplink subframes included in the second subframe subset (step S1005). Herein, the condition A is that one of either the information related to the first configuration or the information related to the second configuration is configured, whereas the condition B is that the information related to the first configuration and the information related to the second configuration are configured. Furthermore, the condition B1 is that uplink power control for uplink subframes in the first subframe subset is configured, while the condition B2 is that uplink power control for uplink subframes in the second subframe subset is configured. Herein, the first subframe subset and the second subframe subset may also be constructed from the information related to the first configuration and the information related to the second configuration.

When a new control information field for uplink power control is configured in the downlink control information format, in the second embodiment, the new control information field is configured only for the transmission of specific subframes. In other words, in the first uplink power control, the new control information field is not configured in the downlink control information format. The new control information field is not configured in the downlink control information format corresponding to uplink subframes included in the first subframe subset for the terminal device 2 configuring the information related to the first configuration and the information related to the second configuration. Meanwhile, a new control information field may be configured in the downlink control information format corresponding to uplink subframes included in the second subframe subset for the terminal device 2 configuring the information related to the first configuration and the information related to the second configuration.

(Modification 1 of Second Embodiment)

Next, Modification 1 of the second embodiment will be described. In Modification 1 of the second embodiment, the base station device 1 transmits, to the terminal device 2, the information related to the first configuration and/or the information related to the second configuration. When the information related to the first configuration and the information related to the second configuration are configured, the terminal device 2 recognizes that a field related to a transmit power control (TPC) command configured in an uplink grant (downlink control information format) for transmitting an uplink signal in an uplink subframe included in the first subframe subset is the field related to the first TPC command, and does not conduct a reception process, but the terminal device 2 recognizes a field related to a transmit power control (TPC) command configured in an uplink grant (downlink control information format) for transmitting an uplink signal in an uplink subframe included in the second subframe subset is the field related to the second TPC command, and conducts the reception process. The terminal device 2 configures the transmit power of the uplink signal on the basis of a power correction value obtained by the reception process.

Described in terms of the basic model of the second embodiment, when only one of either the information related to the first configuration or the information related to the second configuration is configured, the terminal device 2 configures all uplink subframes on the basis of the first TPC command-related field. Meanwhile, when the information related to the first configuration and the information related to the second configuration are configured, the terminal device 2 configures the transmit power of uplink signals transmitted in uplink subframes included in the first subframe subset on the basis of the first TPC command-related field, and configures the transmit power of uplink signals transmitted in uplink subframes included in the second subframe subset on the basis of the second TPC command-related field. Note that since the first TPC command and the second TPC command are similar to Modification 1 of the first embodiment, description thereof will be omitted herein.

In the case of conducting accumulation transmit power control for individual subframe subsets, the TPC command in the DCI format corresponding to each subframe subset may be configured independently. For example, the TPC command field in the DCI format corresponding to the first subframe subset and the TPC command field in the DCI format corresponding to the second subframe subset may have different sizes (bit sizes). In this case, the bit size of the DCI format itself may be the same for the first subframe subset and the second subframe subset. Also, the DCI format may be extended to the extent that the TPC command field is extended.

(Modification 2 of Second Embodiment)

Next, Modification 2 of the second embodiment will be described. In Modification 2 of the second embodiment, the base station device 1 transmits, to the terminal device 2, the information related to the first configuration and/or the information related to the second configuration. Additionally, the base station device 1 transmits information related to a designated power offset to the terminal device 2. In the case of receiving the information related to the first configuration and the information related to the second configuration, if the terminal device 2 receives the information related to a designated power offset, the terminal device 2 configures the transmit power of uplink signals transmitted in uplink subframes included in the second subframe subset on the basis of the designated power offset. Note that in the case of not receiving the information related to a designated power offset, the terminal device 2 configures the transmit power of uplink signals transmitted in uplink subframes included in the first subframe subset and the second subframe subset without accounting for the designated power offset. For example, the designated power offset may be a power ratio of the transmit power of uplink signals transmitted in a first subframe subset and a second subframe subset. Additionally, the designated power offset may also be a power difference of the transmit power of the uplink signal transmitted in a first subframe subset and a second subframe subset.

Described in terms of the basic model of the second embodiment, when only one of either the information related to the first configuration or the information related to the second configuration is configured, the terminal device 2 configures the transmit power of uplink signals for all uplink subframes without accounting for the designated power offset, whereas when the information related to the first configuration and the information related to the second configuration are configured, the terminal device 2 configures the transmit power of uplink signals transmitted in uplink subframes included in the first subframe subset without accounting for the designated power offset, but configures the transmit power of uplink signals transmitted in uplink subframes included in the second subframe subset on the basis of the designated power offset.

Note that information (parameters) related to uplink power control other than the designated power offset may also be shared in common between the first subframe subset and the second subframe subset. In other words, parameters other than the designated power offset may be configured on the basis of the same information related to uplink power control.

As another example described in terms of the basic model of the second embodiment, when only one of either the information related to the first configuration or the information related to the second configuration is configured, the terminal device 2 may also recognize that a field specifying whether or not to apply the designated power offset is not added to the downlink control information format related to uplink (for example, DCI format 0) for all uplink subframes, whereas when the information related to the first configuration and the information related to the second configuration are configured, the terminal device 2 may recognize that a field specifying whether or not to apply the designated power offset is not added to the downlink control information format related to uplink (for example, DCI format 0) for uplink subframes included in the first subframe subset, but recognize that a field specifying whether or not to apply the designated power offset is added to the downlink control information format related to uplink (for example, DCI format 0) for uplink subframes included in the second subframe subset. When application of an uplink power offset is specified in the DCI format, the terminal device 2 configures the transmit power of uplink signals while accounting for the uplink power offset. Note that the designated power offset may also be applied only when transmitting uplink signals in subframes corresponding to a flexible subframe. Herein, when the information related to the first configuration and the information related to the second configuration are used respectively to configure different types of subframes with respect to the same subframe (one subframe), such as an uplink subframe and a downlink subframe, a downlink subframe and a special subframe, or an uplink subframe and a special subframe, such subframes are also called flexible subframes. In other words, a flexible subframe is a subframe that may be processed as a different types of subframe, depending on the situation.

(Modification 3 of Second Embodiment)

Next, Modification 3 of the second embodiment will be described. In Modification 3 of the second embodiment, the base station device 1 transmits, to the terminal device 2, the information related to the first configuration and/or the information related to the second configuration. Additionally, the base station device 1 transmits the information related to the first uplink power control and/or the information related to the second uplink power control to the terminal device 2. In the case of receiving and configuring the information related to the first configuration and the information related to the second configuration, if the terminal device 2 receives the information related to the first uplink power control and the information related to the second uplink power control, the terminal device 2 configures the transmit power of uplink signals transmitted in uplink subframes included in the first subframe subset on the basis of the information related to the first uplink power control, and configures the transmit power of uplink signals transmitted in uplink subframes included in the second subframe subset on the basis of the information related to the second uplink power control. Note that in the case of receiving and configuring only one of either the information related to the first uplink power control and the information related to the second uplink power control, the terminal device 2 configures the transmit power of uplink signals transmitted in uplink subframes included in the first subframe subset and the second subframe subset on the basis of the information related to uplink power control that was received. In other words, the transmit power of uplink signals is configured on the basis of one piece of information related to uplink power control, for all uplink subframes. In this case, if the information related to the first uplink power control and the information related to the second uplink power control are received and configured, the transmit power of uplink signals are configured on the basis of either one of the information related to uplink power control. Note that since the information related to the first uplink power control and the information related to the second uplink power control are similar to what is illustrated in Modification 3 of the first embodiment, description thereof will be omitted herein.

Described in terms of the basic model of the second embodiment, when the information related to the first configuration and the information related to the second configuration are configured, the terminal device 2 configures the transmit power of uplink signals transmitted in uplink subframes included in the first subframe subset on the basis of the information related to the first uplink power control, and configures the transmit power of uplink signals transmitted in uplink subframes included in the second subframe subset on the basis of the information related to the second uplink power control.

Note that when there are parameters not included in the information related to the second uplink power control, the transmit power of uplink signals may be configured using parameters included in the information related to the first uplink power control. Note that the information related to the second uplink power control may also include parameters related to a power offset between subframes (or subframe subsets).

In Modification 3 of the second embodiment, the base station device 1 transmits, to the terminal device 2, the information related to the first configuration and/or the information related to the second configuration. Additionally, the base station device 1 transmits the information related to the first uplink power control and/or the information related to the second uplink power control to the terminal device 2. If the terminal device 2 configures the information related to the first configuration and the information related to the second configuration, the terminal device 2 may construct a first subframe subset and a second subframe subset on the basis of the information related to the first configuration and the information related to the second configuration. Furthermore, if the information related to the first uplink power control and the information related to the second uplink power control are configured, when the terminal device 2 transmits an uplink signal in an uplink subframe included in the first subframe subset, the terminal device 2 configures the transmit power of the uplink signal on the basis of the information related to the first uplink power control, whereas when the terminal device 2 transmits an uplink signal in an uplink subframe included in the second subframe subset, the terminal device 2 configures the transmit power of the uplink signal on the basis of the information related to the second uplink power control.

As another example described in terms of the basic model of the second embodiment, when only one of either the information related to the first configuration or the information related to the second configuration is configured, the terminal device 2 may also recognize that a field specifying a switch between the information related to the first uplink power control and the information related to the second uplink power control is not added to the downlink control information format related to uplink (for example, DCI format 0) for all uplink subframes, whereas when the information related to the first configuration and the information related to the second configuration are configured, the terminal device 2 may recognize that a field specifying a switch between the information related to the first uplink power control and the information related to the second uplink power control is not added to the downlink control information format related to uplink (for example, DCI format 0) for uplink subframes included in the first subframe subset, but recognize that a field specifying a switch between the information related to the first uplink power control and the information related to the second uplink power control is added to the downlink control information format related to uplink (for example, DCI format 0) for uplink subframes included in the second subframe subset.

Note that in Modification 3 of the second embodiment, transmit power control by TPC command (accumulation transmit power control, absolute transmit power control) may also be conducted for individual subframe subsets. In this case, for accumulation transmit power control in each subframe subset, the cumulative value (integrated value, sum value) by accumulation may be reset in the case of reconfiguring the power of a physical channel (PUSCH, PUCCH) configured for each terminal device 2 and included in the uplink power control corresponding to each subframe subset. In addition, the cumulative value of the accumulation corresponding to each subframe subset may also be reset in the case of receiving a random access response message in a downlink subframe corresponding to an uplink subframe included in each subframe subset.

(Modification 4 of Second Embodiment)

Next, Modification 4 of the second embodiment will be described. In Modification 4 of the second embodiment, the base station device 1 transmits, to the terminal device 2, the information related to the first configuration and/or the information related to the second configuration. Additionally, the base station device 1 may map a DCI format in which a power correction value for the extended TPC command is configured (DCI format 3B) to the PDCCH/EPDCCH, and transmit the DCI format to the terminal device 2 able to configure the information related to the first configuration and the information related to the second configuration. When only one of either the information related to the first configuration or the information related to the second configuration is configured, the terminal device 2 receives the DCI format as a DCI format in which the unextended TPC command is configured (DCI format 3/3A) and performs transmit power control of uplink signals on the basis of the DCI format 3/3A, whereas when the information related to the first configuration and the information related to the second configuration are configured, the terminal device 2 performs transmit power control of uplink signals on the basis of the DCI format 3/3A for uplink subframes included in the first subframe subset, but performs transmit power control of uplink signals on the basis of the DCI format configured with the extended TPC command (DCI format 3B) for uplink subframes included in the second subframe subset. Since the definition of the DCI format 3B is similar to Modification 4 of the first embodiment, description thereof will be omitted herein.

(Basic Model of Third Embodiment)

Next, a basic model of the third embodiment will be described. In the basic model of the third embodiment, the base station device 1 transmits, to the terminal device 2, the information related to the first configuration and/or the information related to the second configuration. In addition, the base station device 1 transmits, to the terminal device 2, a physical downlink control channel (PDCCH, EPDCCH) including a first grant and/or a physical downlink control channel including a second grant and/or a physical downlink control channel including a third grant. Herein, the grant may also be a DCI format. Also, a physical downlink control channel including a grant means the same as a physical downlink control channel accompanied by a grant. In other words, a grant is transmitted in the physical downlink control channel (via the physical downlink control channel). When one of either the information related to the first configuration or the information related to the second configuration is configured, and the transmission of an uplink signal (uplink physical channel) is specified by the first grant (a resource for transmission is allocated, an uplink signal is scheduled), the terminal device 2 configures the transmit power of the uplink signal on the basis of the first uplink power control. Additionally, when both of the information related to the first configuration and the information related to the second configuration are configured, and the transmission of an uplink signal (uplink physical channel) is specified by the first grant (a resource for transmission is allocated, an uplink signal is scheduled), the terminal device 2 configures the transmit power of the uplink signal on the basis of one of either the first uplink power control or the second uplink power control. In this case, the transmit power of the uplink signal specified for transmission by the second grant may be controlled similarly to the transmit power control of the uplink signal specified for transmission by the first grant. Also, the transmit power of the uplink signal specified for transmission by the third grant may be configured on the basis of the third uplink power control, irrespectively of the configured information.

In other words, the terminal device 2 is able to perform multiple uplink power controls depending on the information configured in the terminal device 2, even for the same type of grant. In other words, in the terminal device 2, when one of either the information related to the first configuration or the information related to the second configuration is configured, the transmit power of the uplink signal (uplink physical channel) corresponding to the first grant is configured on the basis of the first uplink power control, whereas when both of the information related to the first configuration and the information related to the second configuration are configured, the transmit power of the uplink signal corresponding to the first grant is configured on the basis of one of either the first uplink power control or the second uplink power control. In this case, the transmit power of the uplink signal corresponding to the third grant is always configured on the basis of the third uplink power control, regardless of whether the information related to the first configuration and/or the information related to the second configuration are configured.

For example, a grant related to uplink (uplink grant) may be a semi-persistent grant (semi-persistent scheduling grant), a dynamic scheduled grant, or a random access response grant. The semi-persistent grant is used to specify the transmission of periodic (routine, quasi-static) data. Herein, the semi-persistent grant includes a DCI format with attached CRC parity bits scrambled by the SPS C-RNTI. The dynamic scheduled grant is used to specify the transmission of user data and resource allocation. Herein, the dynamic scheduled grant includes a DCI format with attached CRC parity bits scrambled by the C-RNTI. The random access response grant is used to specify the transmission of data including user information (information about the terminal device 2) and resource allocation with respect to a random access response transmitted from the base station device 1. As discussed above, the random access response grant includes the random access response grant for the contention-based random access procedure. The transmission of the above data is conducted using the PUSCH. In other words, these grants include the specification of PUSCH resource allocation and PUSCH transmission, and PUSCH scheduling.

Herein, the specification of PUSCH transmission by the semi-persistent grant includes the specification of PUSCH resource allocation by the semi-persistent grant, or the scheduling of the PUSCH. The specification of PUSCH transmission by the dynamic scheduled grant includes the specification of PUSCH resource allocation by the dynamic scheduled grant, or the scheduling of the PUSCH. The specification of PUSCH transmission by the random access response grant includes the specification of PUSCH resource allocation by the random access response grant, or the scheduling of the PUSCH. In other words, the specification of PUSCH transmission in each grant includes the specification of PUSCH resource allocation corresponding to each grant, or the scheduling of the PUSCH.

For example, in the terminal device 2, when only one of either the first configuration or the second configuration is set on the basis of received information, and the PUSCH is scheduled by the dynamic scheduled grant, the transmit power of the PUSCH is set on the basis of the first uplink power control (first uplink power control method), whereas when both of the first configuration and the second configuration are set, and the PUSCH is scheduled by the dynamic scheduled grant, the transmit power of the PUSCH is set on the basis of the second uplink power control (second uplink power control method). In this case, if the transmission of the SRS is requested by the same grant (if a positive SRS request is detected), the transmit power of the SRS is set on the basis of the uplink power control applied to the PUSCH. Also, if the PUSCH is scheduled by the semi-persistent grant, the transmit power of the PUSCH may also be set by conducting a similar process. Herein, various power control parameters included in the information related to the first uplink power control and the information related to the second uplink power control may be set to the same parameters as in FIGS. 7, 8, and 9.

In addition, the transmit power of the PUSCH scheduled by the random access response grant is configured on the basis of the third uplink power control (third uplink power control method) when one of either the first configuration of the second configuration is set on the basis of received information, and likewise is configured on the basis of the third uplink power control even if both of the first configuration and the second configuration are configured on the basis of received information. In other words, in this case, the terminal device 2 performs a common uplink power control, regardless of the set configuration.

Note that the information related to the first uplink power control, the information related to the second uplink power control, the information related to the third uplink power control, and the various parameters included in such information may also be configured independently from each other. Also, the information related to the first uplink power control and the information related to the second uplink power control may also be configured on the basis of the examples illustrated in FIGS. 7, 8, and 9. Also, the information related to the third uplink power control may be included in the information related to the configuration of the random access channel.

Independent parameters (preambleInitialReceivedTargetPower ($P_{0\_PRE}$, $\Delta_{PREAMBLE\_Msg3}$) may also be configured in the information related to the transmit power control of an uplink signal corresponding to the random access response grant. Additionally, a dedicated TPC command ($\delta_{msg2}$) may also be applied to the uplink transmit power corresponding to the random access response grant.

When multiple pieces of information related to the transmit power control of an uplink signal corresponding to the random access response grant are configured independently, processing similar to the transmit power control of an uplink signal corresponding to the other grants may be performed.

In other words, switching between one uplink power control and two uplink power controls is performed, depending on the type of the received grant.

In the basic model of the third embodiment, there is a grant for which two uplink power control methods are switched depending on whether or not both of the first configuration and the second configuration are set, and a grant to which the same uplink power control method is applied regardless of whether or not both of the first configuration and the second configuration are set. It is possible to make a distinction between a grant that conducts appropriate power control while accounting for interference, and a grant that conducts power control without accounting for interference.

In the terminal device 2 in which one of either the first configuration or the second configuration is set, if an uplink signal is scheduled by the dynamic scheduled grant or the semi-persistent grant, the terminal device 2 sets the transmit power of the uplink signal on the basis of the first uplink power control method, whereas in the terminal device 2 in which both the first configuration and the second configuration are set, if an uplink signal is scheduled by the dynamic scheduled grant or the semi-persistent grant, the terminal device 2 sets the transmit power of the uplink signal on the basis of the second uplink power control method. Meanwhile, if an uplink signal is scheduled by the random access response grant, the terminal device 2 always configures the transmit power of the uplink signal on the basis of the third uplink power control method, regardless of the set configuration.

(Modification of Third Embodiment)

Next, a modification of the third embodiment will be described. In the modification of the third embodiment, the base station device 1 transmits, to the terminal device 2, the information related to the first configuration and/or the information related to the second configuration. In addition, the base station device 1 transmits, to the terminal device 2, a physical downlink control channel (PDCCH, EPDCCH) including a first grant and/or a physical downlink control channel including a second grant and/or a physical downlink control channel including a third grant. When one of either the first configuration or the second configuration is set on the basis of received information, and the transmission of an uplink signal (uplink physical channel) is specified by the first grant (a resource for transmission is allocated, an uplink signal is scheduled), the terminal device 2 configures the transmit power of the uplink signal on the basis of the first uplink power control. Also, in the terminal device 2, when both the first configuration and the second configuration are set on the basis of received information, a first subframe subset and a second subframe subset may be configured, and the transmission of an uplink signal (uplink physical channel) for an uplink subframe included in the first subframe subset is specified by the first grant (a resource for transmission is allocated, an uplink signal is scheduled), the transmit power of the uplink signal is configured on the basis of the first uplink power control, whereas when the transmission of an uplink signal (uplink physical channel) for an uplink subframe included in the second subframe subset is specified by the first grant (a resource for transmission is allocated, an uplink signal is scheduled), the transmit power of the uplink signal is configured on the basis of the second uplink power control.

Herein, when the first configuration and the second configuration are set, and the terminal device 2 receives a random access response message, the terminal device 2 may also reset the cumulative value of accumulation by a TPC command included in the first uplink power control and/or the second uplink power control. In addition, if UE-specific power parameters ($P_{0\_UE\_PUSCH}$, $P_{0\_UE\_PUCCH}$) are configured for the terminal device 2 in the information related to the first uplink power control and the information related to the second uplink power control, respectively, and these power parameters are reconfigured (the values are changed), the cumulative value of accumulation may also be reset by a TPC command included in each uplink power control.

Herein, when the transmit power control of an uplink signal scheduled by the random access response grant is shared in common between the first subframe subset and the second subframe subset, or in other words, among multiple subframe subsets, the terminal device 2 resets the cumulative value by accumulation after receiving a random access message. In other words, the cumulative value by accumulation may also be reset even if power control according to accumulation was being conducted independently by the first uplink power control and the second uplink power control.

In addition, if UE-specific power parameters ($P_{0\_UE\_PUSCH}$, $P_{0\_UE\_PUCCH}$) are shared in common between the information related to the first uplink power control and the information related to the second uplink power control, respectively, and the UE-specific power parameters are reconfigured (the values are changed), the cumulative value by accumulation is reset. In other words, the cumulative value by accumulation may also be reset even if power control according to accumulation was being conducted independently by the first uplink power control and the second uplink power control.

When both the first configuration and the second configuration are set, if the PUSCH is scheduled by the semi-persistent grant, and the transmit subframe of the PUSCH is a fixed subframe (first subframe), or in other words, if the PUSCH is scheduled for a fixed subframe, the terminal device 2 configures the transmit power of the PUSCH corresponding to the semi-persistent grant on the basis of parameters (for example, $P_{0\_NOMINAL\_PUSCH}$, $P_{0\_UE\_PUSCH}$) configured in the information related to the first uplink power control, whereas if the transmit subframe of the PUSCH is a flexible subframe (second subframe), or in other words, if the PUSCH is scheduled for a flexible subframe, the terminal device 2 configures the transmit power of the PUSCH corresponding to the semi-persistent grant on the basis of parameters (for example, $P_{0\_NOMINAL\_PUSCH}$, $P_{0\_UE\_PUSCH}$) configured in the information related to the second uplink power control.

When both the first configuration and the second configuration are set, if the PUSCH is scheduled by the dynamic scheduled grant, and the transmit subframe of the PUSCH is a fixed subframe (first subframe), or in other words, if the PUSCH is scheduled for a fixed subframe, the terminal device 2 configures the transmit power of the PUSCH corresponding to the dynamic scheduled grant on the basis of parameters (for example, $P_{0\_NOMINAL\_PUSCH}$, $P_{0\_UE\_PUSCH}$) configured in the information related to the first uplink power control, whereas if the transmit subframe of the PUSCH is a flexible subframe (second subframe), or in other words, if the PUSCH is scheduled for a flexible subframe, the terminal device 2 configures the transmit power of the PUSCH corresponding to the dynamic scheduled grant on the basis of parameters (for example, $P_{0\_NOMINAL\_PUSCH}$, $P_{0\_UE\_PUSCH}$) configured in the information related to the second uplink power control.

When both the first configuration and the second configuration are set, and the PUSCH is scheduled by the random access response grant, the terminal device 2 configures the transmit power of the PUSCH corresponding to the random access response grant on the basis of parameters configured in the information related to the same uplink power control, regardless of whether the transmit subframe of the PUSCH is a fixed subframe or a flexible subframe.

In the modification of the third embodiment, for the transmit power of the uplink signal, the uplink power control method is switched according to the subframe subset by the corresponding grant, while for the transmit power of an uplink signal corresponding to the second grant, the same uplink power control method is applied regardless of the subframe subset.

Herein, when a grant and a DCI format 3/3A are detected in the same subframe, the terminal device 2 is able to switch between applying the TPC command set in the grant and applying the TPC command transmitted in the DCI format 3/3A according to the subframe in which an uplink signal is scheduled by the grant.

For example, when a grant and a DCI format 3/3A are detected in the same subframe, if the grant schedules an uplink signal corresponding to an uplink subframe included in a subset of fixed subframes, the transmit power of the uplink signal corresponding to the grant is configured using the power correction value of the TPC command configured in the grant, whereas if the grant schedules an uplink signal corresponding to an uplink subframe included in a subset of flexible subframes, the transmit power of the uplink signal corresponding to the grant is configured using the power correction value of the TPC command configured in the grant, and a virtual transmit power of the uplink signal corresponding to a fixed subframe is configured using the power correction value of the TPC command configured in the DCI format 3/3A.

When a semi-persistent grant and a DCI format 3/3A are detected in the same subframe, the transmit power is configured on the basis of the TPC command included in the semi-persistent grant, regardless of whether the transmit subframe of the PUSCH corresponding to the semi-persistent grant is a fixed subframe or a flexible subframe.

When a dynamic scheduled grant and a DCI format 3/3A are detected in the same subframe, if the transmit subframe of the PUSCH corresponding to the dynamic scheduled grant is a fixed subframe, the transmit power is configured on the basis of the TPC command configured in the dynamic scheduled grant, whereas if the transmit subframe of the PUSCH corresponding to the dynamic scheduled grant is a flexible subframe, the transmit power is configured on the basis of the TPC command configured in the dynamic scheduled grant, and a virtual transmit power is configured on the basis of the TPC command included in the DCI format 3/3A.

When a random access response grant and a DCI format 3/3A are detected in the same subframe, the transmit power is configured on the basis of the TPC command included in the random access response grant, regardless of whether the transmit subframe of the PUSCH corresponding to the random access response grant is a fixed subframe or a flexible subframe.

When the first configuration and the second configuration are set, independent uplink power control methods may be applied to the terminal device 2 between the case in which an uplink signal is scheduled by a downlink control information (DCI) format detected in the common search space (CSS), and the case in which an uplink signal is scheduled by a downlink control information format detected in the UE-specific search space (USS). In other words, when both the first configuration and the second configuration are set, if an uplink signal is scheduled by a DCI format detected in the CSS, the terminal device 2 configures the transmit power of the uplink signal on the basis of first uplink power control method, whereas if an uplink signal is scheduled by a DCI format detected in the USS, the terminal device 2 configures the transmit power of the uplink signal on the basis of the second uplink power control method. Also, if an uplink signal is scheduled by a DCI format detected in the USS, the transmit power of the uplink signal may be configured on the basis of the first uplink power control method or the second uplink power control method.

In addition, transmit power control (accumulation transmit power control, absolute transmit power control) by TPC command set in a DCI format may also be conducted independently between the case of a DCI format detected in the USS scheduling an uplink signal for an uplink subframe included in a first subframe subset and the case of scheduling an uplink signal for an uplink subframe included in a second subframe subset.

Also, when a DCI format detected in the CSS schedules an uplink signal, a common transmit power control may be conducted, regardless of the first subframe subset and the second subframe subset.

(Basic Model of Fourth Embodiment)

Next, a basic model of the fourth embodiment will be described. In the basic model of the fourth embodiment, the base station device 1 transmits, to the terminal device 2, the information related to the first configuration and/or the information related to the second configuration. Also, the base station device 1 attaches, to the downlink control information (DCI) format, cyclic redundancy check (CRC) parity bits scrambled by a first identity or CRC parity bits scrambled by a second identity, and transmits the result to the terminal device 2 in the physical downlink control channel (PDCCH or EPDCCH). When one of either the first configuration or the second configuration is set on the basis of received information, if the CRC parity bits attached to the DCI format are scrambled with the first identity, the transmit power of the uplink signal is configured on the basis of the first uplink power control, whereas if the CRC parity bits attached to the DCI format are scrambled with the second identity, the transmit power of the uplink signal is configured on the basis of the second uplink power control. Also, when both the first configuration or the second configuration are set on the basis of received information, if the CRC parity bits attached to the DCI format are scrambled with the first identity, the transmit power of the uplink signal is configured on the basis of the third uplink power control, whereas if the CRC parity bits attached to the DCI format are scrambled with the second identity, the transmit power of the uplink signal is configured on the basis of the second uplink power control. In other words, the terminal device 2 switches the uplink power control according to the configured information and the type of identity scrambling the CRC parity bits attached to the DCI format. Note that the CRC parity bits simply may also be called the CRC.

The CRC scrambled using the first identity may be called the first CRC, the CRC scrambled using the second identity may be called the second CRC, and the CRC scrambled using the n-th identity (where n is a natural number) may be called the n-th CRC in some cases.

Additionally, the DCI format with the first CRC added thereto may be called the first DCI format, the DCI format with the second CRC attached thereto may be called the second DCI format, and the DCI format with the n-th CRC attached thereto may be called the n-th DCI format in some cases.

Note that in the present invention, the identity used to scramble the CRC may also be called the scramble identity in some cases.

(Modification of Fourth Embodiment)

Next, a modification of the fourth embodiment will be described. In the modification of the fourth embodiment, the base station device 1 transmits, to the terminal device 2, the information related to the first configuration and/or the information related to the second configuration. Also, the base station device 1 attaches, to the downlink control information (DCI) format, cyclic redundancy check (CRC) parity bits scrambled by a first identity or CRC parity bits scrambled by a second identity, and transmits the result to the terminal device 2 in the physical downlink control channel (PDCCH or EPDCCH). When one of either the information related to the first configuration or the information related to the second configuration is configured, if the CRC attached to the DCI format is scrambled using the first identity (first RNTI), the terminal device 2 performs the first uplink power control, whereas if the CRC attached to the DCI format is scrambled using the second identity (second RNTI), the terminal device 2 performs the second uplink power control. When both the information related to the first configuration and the information related to the second configuration are configured, if a first subframe subset and a second subframe subset are constructed, and the CRC attached to a DCI format specifying the transmission of an uplink signal in an uplink subframe included in the first subframe subset is scrambled using the first identity, the terminal device 2 performs the first uplink power control, whereas if the CRC attached to a DCI format specifying the transmission of an uplink signal in an uplink subframe included in the second subframe subset is scrambled using the first identity, the terminal device 2 performs the third uplink power control. If the CRC attached to a DCI format specifying the transmission of an uplink signal in an uplink subframe included in the first subframe subset is scrambled using the second identity, the terminal device 2 performs the second uplink power control, and if the CRC attached to a DCI format specifying the transmission of an uplink signal in an uplink subframe included in the second subframe subset is scrambled using the second identity, the terminal device 2 performs the second uplink power control. Note that the first identity may be the C-RNTI. The second identity may be the temporary C-RNTI. Herein, as discussed earlier, a DCI format with attached CRC parity bits scrambled by the temporary C-RNTI is used in the contention-based random access procedure. Also, the first identity may be a first C-RNTI, while the second identity may be a second C-RNTI. Note that the power parameters used in the first uplink power control and the third uplink power control respectively include cell-specific parameters (parameters included in common information (or system information)) and/or UE-specific parameters (parameters included in dedicated information). The power parameters used in the second uplink power control include only cell-specific parameters.

Note that when accumulation by TPC command is available in the second subframe subset, the second TPC command may also be included in a DCI format with an attached CRC scrambled using a specific identity.

In other words, in the modification of the fourth embodiment, when one of either the information related to the first configuration or the information related to the second configuration is configured, if the transmission of an uplink signal is specified by the first DCI format, the terminal device 2 configures the transmit power of the uplink signal on the basis of the first uplink power control. When both the information related to the first configuration and the information related to the second configuration are configured, the first subframe subset and the second subframe subset may be constructed, and if the transmission of an uplink signal is specified by the first DCI format for an uplink subframe included in the first subframe subset, the terminal device 2 configures the transmit power of the uplink signal on the basis of the first uplink power control, whereas if the transmission of the uplink signal is specified by the first DCI format for an uplink subframe included in the second subframe subset, the terminal device 2 configures the transmit power of the uplink signal on the basis of the second uplink power control.

For example, in the retransmission of the PUSCH for the same uplink data (transport block), the CRC attached to the DCI format specifying the retransmission of the PUSCH may be scrambled using the C-RNTI in one case, and scrambled using the temporary C-RNTI in another case. In the case in which the CRC is scrambled using the C-RNTI, in uplink subframes included in the first subframe subset, the transmit power of the PUSCH is configured on the basis of the first uplink power control, whereas in uplink subframes included in the second subframe subset, the transmit power of the PUSCH is configured on the basis of the second uplink power control. In the case in which the CRC is scrambled using the temporary C-RNTI, in uplink subframes included in the first subframe subset and uplink subframes included in the second subframe subset, the transmit power of the PUSCH is configured on the basis of the same uplink power control (for example, the third uplink power control).

Additionally, in the case of detecting a DCI format in which retransmission is specified, the terminal device 2 may also configure the transmit power of the uplink signal to be retransmitted on the basis of the same uplink power control method, regardless of the subframe subset.

When the transmission of an uplink signal (for example, the PUSCH) is specified (an uplink signal resource is allocated) by the PDCCH (EPDCCH) including a DCI format with an attached CRC scrambled by the C-RNTI, if the transmission of the uplink signal is to be an uplink subframe included in the first subframe subset, the transmit power of the uplink signal is configured on the basis of the first uplink power control, whereas if the transmission of the uplink signal is to be an uplink subframe included in the second subframe subset, the transmit power of the uplink signal is configured on the basis of the second uplink power control. At this point, if the transmission of another uplink signal (for example, the SRS) is specified, the transmit power of the other uplink signal is configured on the basis of the same uplink power control as the transmit power of the uplink signal. Also, when the transmission of an uplink signal (for example, the PUSCH) is specified by the PDCCH (EPDCCH) including a DCI format with an attached CRC scrambled by the temporary C-RNTI, if the transmission of the uplink signal is to be an uplink subframe included in the first subframe subset, the transmit power of the uplink signal is configured on the basis of the third uplink power control, and if the transmission of the uplink signal is to be an uplink subframe included in the second subframe subset, the transmit power of the uplink signal is configured on the basis of the third uplink power control.

By satisfying multiple conditions, the terminal device 2 is able to switch the transmit power control of uplink signals in multiple subframe subsets between a case of performing a common uplink power control and a case of performing an independent uplink power control.

With respect to a specific identity, the terminal device 2 is able to switch the uplink power control according to whether the information related to the first configuration and/or the information related to the second configuration are configured, whereas with respect to a different identity, the terminal device 2 conducts a designated uplink power control regardless of whether the information related to the first configuration and/or the information related to the second configuration are configured.

When both the first configuration and the second configuration are set, if the transmission of an uplink signal accompanied by the C-RNTI is to be performed, the terminal device 2 configures the transmit power of the uplink signal on the basis of the first uplink power control method in an uplink subframe included in the first subframe subset, and configures the transmit power of the uplink signal on the basis of the second uplink power control method in an uplink subframe included in the second subframe subset. If the transmission of an uplink signal accompanied by the temporary C-RNTI is to be performed, the transmit power of the uplink signal is configured on the basis of a common uplink power control method, regardless of the first subframe subset or the second subframe subset.

(Fifth Embodiment)

Next, a fifth embodiment will be described. In the fifth embodiment, the base station device 1 transmits, to the terminal device 2, the information related to the first configuration, the information related to the second configuration, and the downlink control information (DCI) format. For example, when the first configuration or the second configuration is set, if the DCI format 0/4 and the DCI format 3/3A are detected in the same subframe, the terminal device 2 sets the transmit power of the uplink signals using the value of the transmit power control (TPC) command set in the DCI format 0/4, and transmits the uplink signals to the base station device 1. Also, when the first configuration and the second configuration are set, and the DCI format 0/4 and the DCI format 3/3A are detected in the same subframe, if the uplink subframe in which the uplink signal is scheduled by the DCI format 0/4 is a fixed subframe (first subframe), the terminal device 2 sets the transmit power of the uplink signals using a power correction value obtained from the transmit power control (TPC) command provided by the DCI format 0/4, whereas if the uplink subframe in which the uplink signal is scheduled by the DCI format 0/4 is a flexible subframe (second subframe), the terminal device 2 sets the transmit power of the uplink signals corresponding to each DCI format independently using a power correction value obtained from the transmit power control (TPC) command set in the DCI format 0/4, and the DCI format 3/3A. For example, when the terminal device 2 detects the DCI format 0/4 and the DCI format 3/3A in the same subframe, and the uplink subframe in which the uplink signal is scheduled by the DCI format 0/4 is a fixed subframe (first subframe), the terminal device 2 may also drop the DCI format 3/3A. Note that the DCI format 0/4 is used for scheduling of the PUSCH with respect to one uplink cell. Meanwhile, the DCI format 3/3A is used for the transmission (notification) of TPC commands for the PUSCH or the PUSCH. The first subframe may also be configured as a first subframe subset. The second subframe may also be configured as a second subframe subset. In other words, multiple subframes may be configured as the first subframe subset or the second subframe subset. Herein, the DCI format 0/4 may indicate the DCI format 0 or the DCI format 4. Also, the DCI format 3/3A may indicate the DCI format 3 or the DCI format 3A.

When the first configuration and the second configuration are set, the terminal device 2 is able to decide, depending on which subframe is scheduled by the DCI format 0/4, whether or not to apply the TPC command set in the DCI format 3/3A detected in the same subframe. In other words, the terminal device 2, is able to decide, on the basis of whether the DCI format 0/4 is being used to schedule the transmission of an uplink signal in a fixed subframe or to schedule the transmission of an uplink signal in a flexible subframe, whether or not to apply the TPC command set in the DCI format 3/3A detected in the same subframe (switch the processing to be performed on the DCI format 3/3A). In other words, the terminal device 2 is able to decide whether or not to apply the TPC command set in the DCI format 3/3A detected in the same subframe according to whether a first transmit power control method (first uplink power control method) is to be executed, or a second transmit power control method (second uplink power control method) is to be executed. For example, when the terminal device 2 detects the DCI format 0/4 and the DCI format 3/3A in the same subframe, and the first transmit power control method is to be executed on the basis of the DCI format 0/4, the terminal device 2 does not apply the TPC command set in the DCI format 3/3A. In other words, only the first transmit power control method based on the DCI format 0/4 is executed. In addition, when the terminal device 2 detects the DCI format 0/4 and the DCI format 3/3A in the same subframe, and the second transmit power control method is to be executed on the basis of the DCI format 0/4, the terminal device 2 applies the TPC command set in the DCI format 3/3A. In other words, the terminal device 2 executes the first transmit power control method on the basis of the TPC command set in the DCI format 3/3A. In other words, the terminal device 2 executes the second transmit power control method on the basis of the DCI format 0/4, while also executing the first transmit power control method on the basis of the DCI format 3/3A.

Stated differently, in the first transmit power control method, the transmit power of the uplink signals is configured using the TPC commands set in the DCI format 0/4 and the DCI format 3/3A, whereas in the second transmit power control method, the transmit power of the uplink signals is configured using the TPC command set in the DCI format 0/4.

When TPC commands are configured in multiple DCI formats, appropriate transmit power control may be performed by configuring an order of priority.

A subframe subset may also be associated with a TPC command set in a DCI format.

Note that in the foregoing embodiments, a receiving process may also include a detection process. Additionally, a receiving process may also include a demodulation process. Additionally, a receiving process may also include a decoding process.

Note that in the foregoing embodiments, a subframe subset may also indicate a group of specific subframes in a radio frame made up of 10 subframes, for example. As an example, the first subframe subset may be made up of the subframes #0, #1, #2, #5, #6, and #7, while the second subframe subset may be made up of the subframes #3, #4, #8, and #9. These subframe subsets may also be constructed on the basis of specific information.

In the foregoing embodiments, the base station device 1 transmits information related to subframe configuration for constructing subframe subsets to the terminal device 2. Additionally, the base station device 1 transmits information related to uplink power control to the terminal device 2. The terminal device 2 constructs two subframe subsets on the basis of the information related to subframe configuration. In addition, on the basis of the information related to uplink power control, the first uplink power control is performed when transmitting an uplink signal in an uplink subframe of the first subframe subset, and the second uplink power control is performed when transmitting an uplink signal in an uplink subframe of the second subframe subset.

In the foregoing embodiments, the base station device 1 may also transmit information related to subframe configuration for constructing subframe subsets to the terminal device 2. Additionally, the base station device 1 transmits information related to uplink power control to the terminal device 2. The terminal device 2 constructs two subframe subsets on the basis of the information related to subframe configuration. In addition, on the basis of the information related to uplink power control, the first uplink power control is performed when transmitting an uplink signal in an uplink subframe of the first subframe subset, and the second uplink power control is performed when transmitting an uplink signal in an uplink subframe of the second subframe subset.

In the foregoing embodiments, the terminal device 2 may also construct the first subframe subset and the second subframe subset on the basis of the information related to the first configuration and the information related to the second configuration. Herein, the first subframe subset refers to a set of subframes in which the same type of subframe is configured in the same subframes between the information related to the first configuration and the information related to the second configuration (uplink subframe and uplink subframe, downlink subframe and downlink subframe, or special subframe and special subframe), whereas the second subframe subset refers to a set of subframes in which different types of subframes are configured for the same subframes between the information related to the first configuration and the information related to the second configuration (downlink subframe and uplink subframe, downlink subframe and special subframe, or uplink subframe and special subframe). For example, the information related to the first configuration and the information related to the second configuration may also be configured on the basis of the TDD UL/DL configuration.

In the foregoing embodiments, when both the first configuration and the second configuration are set, the terminal device 2 may set subframes in which to transmit an uplink signal (uplink subframes) on the basis of the information related to the first configuration, and set subframes in which to receive a downlink signal (downlink subframes) on the basis of the information related to the second configuration. Herein, when the subframes configured as uplink subframes by the information related to the first configuration are the same as the subframes configured as downlink subframes by the information related to the second configuration, or in other words, when both an uplink subframe and a downlink subframe are configured for the same subframe, that subframe may be called a flexible subframe in some cases. When transmitting an uplink signal in a flexible subframe, the transmit power control may be conducted independently from other uplink subframes.

Note that in the case of constructing the first subframe subset and the second subframe subset on the basis of the information related to the first configuration and the information related to the second configuration, besides the above configuration method, there is also a method in which information related to the TDD UL/DL configuration is included in one of either the information related to the first configuration or the information related to the second configuration, while information specifying flexible subframes or information specifying fixed subframes is included in the other of the information. Note that information specifying fixed subframes refers to information specifying subframes not processed as flexible subframes in the information related to the first configuration, and may also be information specifying a specific type of subframe.

Note that when the information related to the first configuration and the information related to the second configuration are the same (or indicate the same configuration), multiple subframe subsets may also not be constructed.

Priority levels of physical channels/physical signals to transmit depending on the type of physical channel may also be configured or defined in advance in the terminal device 2.

Note that in the foregoing embodiments, the terminal device 2 may also report a received power measurement result based on the second uplink reference signal to the base station device 1. The terminal device 2 may also perform the reporting periodically. Additionally, the terminal device 2 may also perform the reporting when a certain condition is satisfied.

Note that in the foregoing embodiments, when the terminal device 2 measures the received power based on the second uplink reference signal, the terminal device 2 may also perform transmit power control of an uplink signal on the basis of the received power. Additionally, the terminal device 2 may also determine the downlink path loss on the basis of the received power.

Note that in the foregoing embodiments, when the total of the transmit power of various uplink signals, including the transmit power of the first uplink reference signal and/or the second uplink reference signal, exceeds a maximum transmit power configured in the terminal device 2, the terminal device 2 may also not transmit the first uplink reference signal and/or the second uplink reference signal.

Note that the foregoing embodiments may also be realized in combination with each other. For example, Modification 1 of the first embodiment and Modification 3 of the first embodiment may be combined. Modification 1 of the second embodiment and Modification 3 of the second embodiment may also be combined.

Note that in the foregoing embodiments, the subframe in which to actually transmit an uplink signal and/or the subframe in which to actually receive a downlink signal may also be configured on the basis of information configured independently from the information related to the first configuration and the information related to the second configuration (for example, third configuration-related information).

Note that in the foregoing embodiments, the information related to the first configuration and/or the information related to the second configuration may be communicated by the system information block type 1 (SIB1) or RRC messages. In addition, the information related to the first configuration and the information related to the second configuration may also be communicated in the same SIB1 or RRC message.

Note that in the foregoing embodiments, the information related to the first configuration and the information related to the second configuration may be configured in the same RRC message, the same system information, or the same information element. Additionally, the information related to the first configuration and the information related to the second configuration may also be configured in different RRC messages, different system information, or different information elements. Additionally, the information related to the first configuration and the information related to the second configuration are configured independently as different parameters.

Herein, in the foregoing embodiments, when the information related to the first configuration is a TDD UL/DL configuration communicated in the system information block type 1 (SIB1) or an RRC message, the information related to the second configuration may be an additional TDD UL/DL configuration (second TDD UL/DL configuration). In addition, the information related to the second configuration may also be information specifying flexible subframes (a flexible subframe pattern). In addition, the information related to the second configuration may also be information specifying fixed subframes (a fixed subframe pattern). Additionally, the information related to the second configuration may be information related to Release 12 (r12) or Version 12 (v12). Additionally, the information related to the second configuration may also be information specifying a subframe pattern corresponding to the first subframe subset discussed earlier. Additionally, the information related to the second configuration may also be information specifying a subframe pattern corresponding to the second subframe subset discussed earlier. Additionally, the information related to the second configuration may also be information specifying a subframe pattern to which the PDCCH/EPDCCH (DCI format) accompanying a TPC command for flexible subframes is allocable. Additionally, the information related to the second configuration may also be information specifying a pattern of subframes in which the CRS is receivable. Additionally, the information related to the second configuration may also be information specifying a pattern of subframes in which the CSI-RS is receivable. Additionally, the information related to the second configuration may also be information specifying a pattern (set) of subframes in which channel state information (CSI, CQI, PMI, RI) may be reported. Additionally, the information related to the second configuration may also be information specifying a pattern of subframes that limit measurement in the time domain with respect to measurement in the primary cell (received power RSRP, received quality RSRQ, radio link monitoring). In other words, the information related to the second configuration may also be information specifying a pattern of subframes in which to conduct measurement. Additionally, the information related to the second configuration may also be information specifying a pattern of subframes in which to limit measurement in the time domain with respect to measurement in an adjacent cell. Additionally, the information related to the second configuration may also be information specifying a pattern of subframes in which to limit measurement in the time domain with respect to measurement in a secondary cell. Also, the information related to the second configuration may be configured on the basis of a measurement subframe pattern. Additionally, the information related to the second configuration may also be information specifying a pattern of subframes in which a downlink signal is receivable. Additionally, the information related to the second configuration may also be extensible information. Additionally, the information related to the first configuration may also be information related to the transmission availability of the physical uplink control channel in a second cell (secondary cell). Additionally, the information related to the second configuration may also be information specifying a pattern (set) of subframes associated with the reporting of certain channel state information (CSI, CQI, PMI, RI). Additionally, the information related to the second configuration may also be information configured separately from information specifying a pattern (set) of subframes associated with the reporting of certain channel state information (CSI, CQI, PMI, RI) different from the second configuration. In other words, a third configuration and a fourth configuration may be configured separately from the second configuration, and either may be information specifying a pattern (set) of subframes similar to the second configuration. In other words, a third configuration and a fourth configuration may be configured separately from the second configuration, and either may be information configured separately from information specifying a pattern (set) of subframes associated with the reporting of certain channel state information (CSI, CQI, PMI, RI). In addition, the report may be channel state information (CSI, CQI, PMI, RI) computed on the basis of the CSI-RS and/or the zero power CSI-RS and/or the CSI-IM included in an associated subframe pattern (set). The above may be applied similarly up to the n-th configuration discussed earlier. Also, a plurality of the second configuration may also be configured, and the first uplink power control and the second uplink power control may also be switched on the basis of any thereof. In other words, the information related to the second configuration may be an additional TDD UL/DL configuration (second TDD UL/DL configuration), and additional information specifying a pattern (set) of subframes associated with the reporting of certain channel state information (CSI, CQI, PMI, RI) may be configured. Note that the information related to the second configuration may also be decided uniquely by the system. Additionally, the information related to the second configuration may also be broadcast as common information or system information. Additionally, the information related to the second configuration may be communicated individually to each terminal device 2 as terminal device-specific dedicated information. Information indicating whether or not the information related to the second configuration may be configured (UE capability) may also be communicated from the terminal device 2 to the base station device 1.

Herein, the information related to the first configuration and/or the information related to the second configuration may also be configured by a bit map. Furthermore, the bit map may be made up of 40 bits or 80 bits.

Herein, in the information related to the first configuration and/or the information related to the second configuration, the configuration of uplink subframes, downlink subframes, and special subframes may also be indicated by an index (or an information bit or bit sequence expressing an index) on the basis of a table. For example, the table may be a table of TDD UL/DL configurations. A table expressing TDD UL/DL configurations may be structured as in FIG. 3.

Note that in the foregoing embodiments, the information related to the second configuration may also be an additional TDD UL/DL configuration (second TDD UL/DL configuration). Additionally, the information related to the second configuration may also be information specifying blank subframes. In addition, the information related to the second configuration may also be information specifying flexible subframes (a flexible subframe pattern). In addition, the information related to the second configuration may also be information specifying fixed subframes (a fixed subframe pattern). At this point, the uplink reference UL-DL configuration and the uplink reference UL-DL configuration may also be computed from the information related to the first configuration and the information related to the second configuration using a table or the like. In other words, the uplink reference UL-DL configuration and the downlink reference UL-DL configuration may also be decided by using a table or the like as information related to a third configuration, in addition to the information related to the first configuration and the information related to the second configuration.

Note that in the foregoing embodiments, the base station device 1 or the terminal device 2 may also configure one from among the information related to the first configuration and the information related to the second configuration as the uplink reference UL-DL configuration, and the other as the downlink reference UL-DL configuration. For example, the terminal device 2 may configure the uplink reference UL-DL configuration and the downlink reference UL-DL configuration after receiving both of the information related to the first configuration and the information related to the second configuration. Note that DCI formats related to uplink (for example, DCI format 0/4) may also be transmitted in downlink subframes configured by the uplink reference UL-DL configuration.

Additionally, the uplink reference UL-DL configuration and the downlink reference UL-DL configuration may each be configured using the same table. However, when the index of the uplink reference UL-DL configuration and the downlink reference UL-DL configuration is configured on the basis of the same table, it is preferable for the uplink reference UL-DL configuration and the downlink reference UL-DL configuration to be configured by different indices. In other words, it is preferable for different subframe patterns to be configured between the uplink reference UL-DL configuration and the downlink reference UL-DL configuration.

In the foregoing embodiments, when the information related to the first configuration and the information related to the second configuration are both TDD UL/DL configurations, depending on conditions, either one may be configured as the uplink reference UL-DL configuration, while the is configured as the downlink reference UL-DL configuration. Note that the uplink reference UL-DL configuration is used to decide at least the correspondence between the subframes in which the physical downlink control channel is mapped and the subframes in which the physical uplink shared channel corresponding to the physical downlink control channel is mapped, and may be different from the transmission direction (that is, uplink or downlink) of actual signals. The downlink reference UL-DL configuration is used to decide at least the correspondence between the subframes in which the physical downlink shared channel is mapped and the subframes in which the HARQ-ACK corresponding to the physical downlink shared channel is transmitted, and may be different from the transmission direction (that is, uplink or downlink) of actual signals. In other words, the uplink reference UL-DL configuration is used to specify (select, decide) the correspondence between a subframe n in which the PDCCH/EPDCCH/PHICH is mapped, and a subframe n+k in which the PUSCH corresponding to the above PDCCH/EPDCCH/PHICH is mapped. When one primary cell is configured, or alternatively, when one primary cell and one secondary cell are configured, and the uplink reference UL-DL configuration for the primary cell is the same as the uplink reference UL-DL configuration for the secondary cell, in each of the two serving cells, the corresponding uplink reference UL-DL configuration is used to decide the correspondence between the subframe in which the PDCCH/EPDCCH/PHICH is mapped, and the subframe in which the PUSCH corresponding to the above PDCCH/EPDCCH/PHICH is mapped. Additionally, the downlink reference UL-DL configuration is used to specify (select, decide) the correspondence between a subframe n in which the PDSCH is mapped, and a subframe n+k in which the HARQ-ACK corresponding to the above PDSCH is transmitted. When one primary cell is configured, or alternatively, when one primary cell and one secondary cell are configured, and the downlink reference UL-DL configuration for the primary cell is the same as the downlink reference UL-DL configuration for the secondary cell, in each of the two serving cells, the corresponding downlink reference UL-DL configuration is used to specify (select, decide) the correspondence between the subframe in which the PDSCH is mapped, and the subframe in which the HARQ-ACK corresponding to the above PDSCH is mapped.

Additionally, in the terminal device 2, if a TDD UL/DL configuration for uplink transmission reference (first TDD UL/DL configuration) and a TDD UL/DL configuration for downlink transmission reference (second TDD UL/DL configuration) are configured, and additionally, if information related to the uplink transmit power control is configured, when the same type of subframe is configured by the first TDD UL/DL configuration and the second TDD UL/DL configuration, the uplink power control of the subframe is conducted on the basis of the first uplink power control, whereas when different types of subframes are configured by the first TDD UL/DL configuration and the second TDD UL/DL configuration, the uplink power control of the subframe is conducted on the basis of the second transmit power control.

When the second TDD UL/DL configuration (for example, tdd-Config-v12, tdd-Config-r12, tdd-ConfigULreference-v12, tdd-ConfigDLreference-r12) is configured/added as a parameter as the information related to the second configuration, the terminal device 2 may transmit uplink signals on the basis of the first TDD UL/DL configuration, and receive downlink signals on the basis of the second TDD UL/DL configuration. When the transmission of an uplink signal and the reception of a downlink signal occur in a certain subframe, which signal to prioritize may be decided on the basis of transmission direction configuration information (information related to a third configuration).

Note that in the foregoing embodiments, the information related to the first configuration and/or the information related to the second configuration may also be TDD UL/DL configurations (TDD configurations, tdd-Config, uplink-downlink configurations). Additionally, the information related to the first configuration and/or the information related to the second configuration may also be subframe patterns indicated by a bit map. Additionally, either one of the information related to the first configuration and the information related to the second configuration may be information specifying uplink subframes, while the other one may be information specifying downlink subframes. This specifying information may be defined by a table or defined by a bit map.

Note that the base station device 1 may, with respect to the terminal device 2 in which the information related to the first configuration and the information related to the second configuration are configurable, specify uplink subframes with either one of the information related to the first configuration or the information related to the second configuration, and specify downlink subframes with the other one. Additionally, when only one of either the information related to the first configuration or the information related to the second configuration is configured, the terminal device 2 recognizes subframes other than the specified subframes as different types of subframes, and conducts a transmission/reception process. For example, when uplink subframes are specified by the information related to the first configuration and downlink subframes are specified by the information related to the second configuration, the terminal device 2 configuring only the information related to the first configuration recognizes subframes other than the uplink subframes specified on the basis of the information related to the first configuration as downlink subframes or special subframes, and conducts a reception process/transmission process. Additionally, the terminal device 2 configuring only the information related to the second configuration recognizes subframes other than the downlink subframes specified on the basis of the information related to the second configuration as uplink subframes or special subframes, and conducts a transmission process/reception process. Note that an uplink subframe and a downlink subframe may be configured for the same subframe by the information related to the first configuration and the information related to the second configuration.

For example, when the information related to the first configuration and the information related to the second configuration are configured, the terminal device 2 may perform the transmission of uplink signals on the basis of the information related to the first configuration, and the reception of downlink signals on the basis of the information related to the second configuration. Additionally, when the information related to the first configuration and the information related to the second configuration are configured, the terminal device 2 may perform the reception of downlink signals on the basis of the information related to the first configuration, and the transmission of uplink signals on the basis of the information related to the second configuration. Which configuration information to use as a basis for conducting the transmission of uplink signals and the reception of downlink signals may be decided on the basis of information related to a third configuration.

Herein, provided that the information related to the first configuration is a TDD UL/DL configuration, the information related to the second configuration may also be information specifying flexible subframes. Note that the information related to the second configuration may be managed by a table. Additionally, the information related to the second configuration may also be information specifying subframes to configure as flexible subframes according to a bit map.

Note that in the foregoing embodiments, a flexible subframe is a subframe that may be an uplink subframe or a downlink subframe. Additionally, a flexible subframe is a subframe that may be a downlink subframe or a special subframe. Additionally, a flexible subframe is a subframe that may be an uplink subframe or a special subframe. In other words, a flexible subframe is a subframe that may be a first subframe or a second subframe. For example, a subframe configured as a flexible subframe is processed as a first subframe (for example, an uplink subframe) in the case of a Condition 1, but processed as a second subframe (for example, a downlink subframe) in the case of a Condition 2.

Note that flexible subframes may also be configured on the basis of the information related to the first configuration and the information related to the second configuration. For example, when a certain subframe i is configured as an uplink subframe by the information related to the first configuration and configured as a downlink subframe by the information related to the second configuration, the subframe i becomes a flexible subframe. Flexible subframes may also be configured on the basis of information specifying a subframe pattern of flexible subframes.

In addition, in the foregoing embodiments, the information related to the first configuration and the information related to the second configuration may not be two TDD UL/DL configurations, but instead one TDD UL/DL configuration and a flexible subframe pattern (downlink candidate subframe pattern or uplink candidate subframe pattern, additional subframes). For a subframe index indicated by the flexible subframe pattern, even if the TDD UL/DL configuration indicates an uplink subframe, if an uplink signal is not to be transmitted in that subframe, the terminal device 2 may receive a downlink signal in that subframe. Likewise, even if the TDD UL/DL configuration indicates a downlink subframe, if the transmission of an uplink signal in that subframe is specified in advance, the terminal device 2 may transmit an uplink signal in that subframe. A specific subframe may also be specified as an uplink/downlink candidate subframe.

If the information related to the first configuration and the information related to the second configuration are both configured, the terminal device 2, on the basis of a certain condition, recognizes either one as a subframe subset for uplink, and the other one as a subframe subset for downlink. Herein, the subframe subset for uplink refers to a set of subframes configured for transmission of the PUSCH and the PHICH, while the downlink subframe subset refers to a set of subframes configured for transmission of the PDSCH and the HARQ. Information indicating the association between PUSCH and PHICH subframes, as well as information indicating the association between PDSCH and HARQ subframes, may be configured in advance in the terminal device 2. In other words, either one of the information related to the first configuration or the information related to the second configuration may be information specifying a subframe pattern of uplink subframes, while the other one may be information specifying a subframe pattern of downlink subframes. This information may be configured by a bit map.

Note that in the foregoing embodiments, when two subframe subsets are constructed as a result of the information related to the first configuration and the information related to the second configuration being configured, accumulation transmit power control and/or absolute transmit power control according to TPC commands may be performed individually on each subframe subset. For example, if the terminal device 2 receives information related to a third configuration, the terminal device 2 performs transmit power control according to TPC commands on each subframe subset. Herein, accumulation transmit power control and absolute transmit power control may also be called closed-loop transmit power control in some cases. Herein, accumulation transmit power control refers to performing power correction accounting for power correction values configured in previously received TPC commands, while absolute transmit power control refers to power control accounting for only the power correction value from the TPC command received in the subframe immediately prior to the subframe in which to transmit an uplink signal. Herein, absolute transmit power control by TPC command controls the transmit power by accounting for only the power correction value from the currently-received TPC command, without accounting for power correction values from previously received TPC commands. Accumulation transmit power control controls the transmit power by accounting for power correction values from previously received TPC commands.

Note that in the foregoing embodiments, power control may include a power control method, a power control procedure, a power control process, and the like. In other words, the first uplink power control method, the first uplink power control procedure, and the like may be included in the first uplink power control.

Note that in the foregoing embodiments, by configuring the information related to the first configuration and the information related to the second configuration, when two or more subframe subsets are constructed independently, a maximum transmit power ($P_{CMAX, c}$) configured for each terminal device 2 may be configured for each subframe subset. In other words, multiple, independent maximum transmit powers may be configured in the terminal devices 2.

In addition, when the resource allocation of various uplink signals is the same, the base station device 1 may detect the various uplink signals according to differences in the signal sequences of the respective uplink signals. In other words, the base station device 1 may identify each uplink signal according to differences in the signal sequences of the received uplink signals. Additionally, the base station device 1 may determine whether or not an uplink signal is addressed to the base station device 1 itself according to differences in the signal sequences of the received uplink signals.

Furthermore, when the base station device 1 specifies a received power measurement using the second downlink reference signal, the terminal device 2 may compute the downlink path loss on the basis of the measurement result, and use the computed downlink path loss for uplink transmit power control.

Herein, the received power measurement may also be called the reference signal received power (RSRP) measurement or the received signal power measurement in some cases. Also, the received quality measurement may also be called the reference signal received quality (RSRQ) measurement or the received signal quality measurement in some cases.

Additionally, the resource allocation (mapping to resource elements, mapping to physical resources) of the second downlink reference signal may also be frequency-shifted. The frequency shift of the second downlink reference signal may be decided on the basis of the physical cell ID. Also, the frequency shift of the second downlink reference signal may be decided on the basis of the virtual cell ID.

As an example, information specifying whether or not to conduct received power measurement of the second downlink reference signal is communicated from the base station device 1 to the terminal device 2. When the specifying information specifies that received power measurement of the second downlink reference signal may be conducted, the terminal device 2 conducts received power measurement of the second downlink reference signal. At this point, the terminal device 2 may also conduct received power measurement of the first downlink reference signal in parallel. When the specifying information specifies that received power measurement of the second downlink reference signal may not be conducted, the terminal device 2 conducts received power measurement of only the first downlink reference signal. Furthermore, the specifying information may also include information specifying whether or not to conduct received quality measurement of the second downlink reference signal. Additionally, received power measurement of a third downlink reference signal may also be conducted irrespectively of the above specifying information.

In addition, as another example, information specifying whether to conduct received power measurement of the first downlink reference signal or received power measurement of the second downlink reference signal may also be communicated from the base station device 1 to the terminal device 2. When the specifying information specifies that received power measurement of the first downlink reference signal is to be conducted, the terminal device 2 conducts received power measurement of the first downlink reference signal. When the specifying information specifies that received power measurement of the second downlink reference signal is to be conducted, the terminal device 2 conducts received power measurement of the second downlink reference signal. In other words, the specifying information is information specifying a switch of the received power measurement. Additionally, the specifying information may also include information specifying whether or not to conduct received quality measurement. In this example, the specifying information is described as being information specifying a switch of the received power measurement between two downlink reference signals, but may also be information specifying a switch of the received power measurement among three or more downlink reference signals. Additionally, received power measurement of a third downlink reference signal may also be conducted irrespectively of the above specifying information. Additionally, the transmit power of the second downlink reference signal and/or the transmit power of the third downlink reference signal may also be set on the basis of the transmit power of the first downlink reference signal. For example, a ratio of power (power offset) between the first downlink reference signal and the second downlink reference signal (or the third downlink reference signal) may be configured.

In the case of downlink, in a downlink subframe included in the first subframe subset, received power measurement of the downlink signal may be conducted without accounting for the power offset, whereas in a downlink subframe included in the second subframe subset, received power measurement of the downlink signal may be conducted while accounting for the power offset. The power offset may be configured by the base station device 1 in advance. Additionally, the power offset may also be specified by being configured in a DCI format related to downlink.

Note that in the foregoing embodiments, even when the information related to the first configuration and the information related to the second configuration are configured, the accumulation/absolute transmit power control may be shared in common if multiple subframe subsets have not been constructed.

Note that in the foregoing embodiments, in a flexible subframe, the terminal device 2 may conduct power control (uplink power control, downlink power control) that is different from the uplink subframes/downlink subframes/special subframes not configured as flexible subframes. Additionally, closed-loop transmit power control (accumulation transmit power control) may also be conducted independently between flexible subframes and uplink subframes/downlink subframes/special subframes. For example, in such subframes, the power may be controlled using different parameters from the other uplink subframes or downlink subframes. Additionally, the parameters used for signal generation may also be configured independently between flexible subframes and uplink subframes/downlink subframes. For example, the virtual cell ID, scrambling ID, and the like may be configured independently. Herein, generating a signal includes generating a signal sequence. Also, generating a signal include deciding radio resources to allocate to the signal.

Note that in the foregoing embodiment, the first subframe subset may be constructed out of subframes with fewer sources of interference (in other words, the interference is small or weak) from the perspective of the terminal device 2. The second subframe subset may be constructed out of subframes with more sources of interference (in other words, the interference is large or strong) from the perspective of the terminal device 2. Herein, a subframe with few sources of interference refers to a subframe in which a downlink subframe and an uplink subframe are not configured for the same subframe. Herein, a subframe with many sources of interference refers to a subframe in which a downlink subframe and an uplink subframe are configured for the same subframe.

Note that in the foregoing embodiments, the same RSRP and path loss values may be applied between the first uplink power control and the second uplink power control. Received power measurement control may also be shared in common between downlink subframes included in two subframe subsets.

Note that in the foregoing embodiments, when the transmission of the PUSCH and PUCCH occurs in a flexible subframe, and the total transmit power for the above exceeds a maximum transmit power configured in the terminal device, the maximum value of the transmit power of the PUSCH may be treated as the value obtained by subtracting the transmit power of the PUCCH from the maximum transmit power.

Note that in the foregoing embodiments, power parameters used in common among multiple uplink power controls are also acceptable. In other words, some parameters may be shared in common among multiple uplink power controls. For example, parameters configured only in the information related to the first uplink power control may be used by the second uplink power control and the third uplink power control as necessary.

Additionally, in the foregoing embodiments, the base station device 1 may also use an uplink index to control the terminal device 2 to transmit uplink signals in subframes that do not collide with subframes in which an uplink subframe and a downlink subframe collide.

Accumulation control may also be shared in common between two subframe subsets. Accumulation may also be shared in common irrespectively of subframe subsets.

Note that in the foregoing embodiments, a TPC command for a (scheduled) PUSCH used in the first uplink power control is set in the DCI format 0/4 or the DCI format 3/3A, while a TPC command for a (scheduled) PUSCH used in the second uplink power control is set in the DCI format 0/4. Also, a TPC command for the PUSCH used in the first uplink power control is set in the DCI format 1/1A/1B/1D/2/2A/2B/2C/2D/3/3A, while a TPC command for the PUCCH used in the second uplink power control is set in, for example, the DCI format 1/1A/1B/1D/2/2A/2B/2C/2D. For example, it is possible to decide, depending on to which subframe subset an uplink signal to be applied belongs, whether a detected TPC command will be applied to the first uplink power control or the second uplink power control. Accumulation control may also be performed independently between the case in which the TPC command set in the DCI format 0 corresponds to an uplink subframe included in the first subframe subset, and the case in which the TPC command set in the DCI format 0 corresponds to an uplink subframe included in the second subframe subset. For example, when the terminal device 2 detects the DCI format 0 and the DCI format 3 in the same subframe, and the DCI format 0 is attempting to schedule an uplink signal for an uplink subframe included in the first subframe subset, the terminal device 2 configures the uplink power on the basis of the TPC command set in the DCI format 0, and if the DCI format 0 is attempting to schedule an uplink signal for an uplink subframe included in the second subframe subset, the terminal device 2 configures the uplink power on the basis of the TPC command set in the DCI format 0. Furthermore, the transmit power of an uplink signal corresponding to an uplink subframe included in the first subframe subset is configured on the basis of the TPC command set in the DCI format 3. In other words, if the first configuration and the second configuration are set, subframe subsets and DCI formats may be associated together.

RSRP measurement results may also be shared in common between two subframe subsets. RSRP may also be shared in common irrespectively of subframe subsets.

In addition, accumulation control may be conduct independently in subframe subsets. Accumulation by TPC commands received in fixed subframes and accumulation by TPC commands received in flexible subframes may be controlled independently.

For example, when the information related to the first configuration and the information related to the second configuration are configured, accumulation transmit power control (closed-loop transmit power control) may be conducted independently for each subframe subset.

In the case of conducting accumulation transmit power control for individual subframe subsets, the respective timings at which to receive a DCI format including a TPC command field may be defined in advance.

Additionally, RSRP measurement results may be independent between subframe subsets. Measurement control of the RSRP from the CRS received in a downlink subframe of a fixed subframe and the RSRP from the CRS received in a flexible subframe may also be conducted independently.

When two subframe subsets are configured on the basis of the information related to the first configuration and the information related to the second configuration, provided that the second subframe subset is a subframe pattern of flexible subframes, the information related to the second configuration may also be information specifying a pattern of subframes in which a DCI format including a TPC command field for flexible subframes is receivable.

A pattern of subframes in which a TPC command applicable to uplink subframes included in the first subframe subset is transmitted, and a pattern of subframes in which a TPC command applicable to uplink subframes included in the second subframe subset is transmitted, may also be respectively configured. Associations (relationships) between an uplink subframe and a downlink subframe in which a DCI format including a TPC command for that uplink subframe is transmitted may also be managed by a table.

Note that in the foregoing embodiments, the information related to the first configuration and/or the information related to the second configuration may also be information specifying the switch periodicity of uplink and downlink, and the structure of the respective subframes.

Note that in the foregoing embodiments, uplink signals and/or downlink signals may be subjected to different transmit power control between flexible subframes and all other subframes.

Note that in the foregoing embodiments, when the information related to the first configuration is configured, the terminal device 2 does not have to transmit the first uplink reference signal (for example, the P-SRS) to a cell (serving cell) in which the information related to the first configuration is configured. In addition, in the foregoing embodiments, when the information related to the first configuration is configured, the terminal device 2 does not have to transmit an uplink reference signal for which a specific transmit subframe is configured by a higher layer.

Note that the foregoing embodiments describe using resource elements and resource blocks as the units of mapping for various uplink signals and downlink signals, and using symbols, subframes, and radio frames as the units of transmission in the time direction, but the foregoing embodiments are not limited thereto. Similar advantageous effects may be obtained even by using regions and time units made up of arbitrary frequencies and lengths of time instead of the above. Note that although the foregoing embodiments describe the case of demodulating by using a precoded RS, and describe using ports equivalent to the MIMO layer as the ports corresponding to the precoded RS, the foregoing embodiments are not limited thereto. Besides the above, similar advantageous effects may also be obtained by applying the present invention to ports corresponding to mutually different reference signals. For example, an unprecoded (nonprecoded) RS may be used instead of a precoded RS, and for the port, a port equivalent to an output terminal after precoding or a port equivalent to a physical antenna (or combination of physical antennas) may be used.

Note that in the foregoing embodiments, accumulation transmit power control or absolute transmit power control by TPC commands may also be conducted.

Note that in the foregoing embodiments, uplink transmit power control refers to transmit power control of uplink physical channels/physical signals (such as the PUSCH, PUCCH, PRACH, SRS, and DMRS), and transmit power control includes information related to the switching or (re)configuration of various parameters used to configure the transmit power of various uplink physical channels. Meanwhile, downlink transmit power control refers to transmit power control of downlink physical channels/physical signals (such as the CRS, UERS (DLDMRS), CSI-RS, PDSCH, PDCCH/EPDCCH, PBCH, PSS/SSS, PMCH, and PRS), and transmit power control includes information related to the switching or (re)configuration of various parameters used to configure the transmit power of various downlink physical channels.

Note that in the foregoing embodiments, the base station device may also be enabled to configure multiple virtual cell IDs for a single terminal device. For example, a base station device and a network including at least one base station device may be enabled to configure a virtual cell ID independently for each physical channel/physical signal. Additionally, the configuration of multiple virtual cell IDs for one physical channel/physical signal may be enabled. In other words, the configuration of a virtual cell ID for each piece of information related to the configuration of each physical channel/physical signal may be enabled. Additionally, a virtual cell ID may also be shared in common among multiple physical channels/physical signals.

In the present invention, uplink power control is described, but downlink power control may also be controlled similarly.

In the present invention, uplink power control is described, but channel estimation control on the downlink may also be controlled similarly. Also, in the present invention, uplink power control is described, but application to the control of channel state information reporting is also possible. In the present invention, uplink power control is described, but application to the control of received power measurement is also possible.

Note that in the foregoing embodiments, for example, the phrase "setting power" includes setting a value of power, the phrase "calculating power" includes calculating a value of power, the phrase "measuring power" includes measuring a value of power, and the phrase "reporting power" includes reporting a value of power. In this way, the term "power" also includes the meaning of a value of power where appropriate.

Note that in the foregoing embodiments, for example, the phrase "calculating path loss" includes calculating a value of path loss. In this way, the term "path loss" also includes the meaning of a value of path loss where appropriate.

Note that in the foregoing embodiments, the phrase "configuring various parameters" includes configuring the values of various parameters. In this way, the term "various parameters" also includes the meaning of the values of various parameters where appropriate.

A program operating on a base station device 1 and a terminal device 2 according to the present invention is a program that controls a CPU or the like (a program that causes a computer to function) so as to realize the functions of the foregoing embodiments according to the present invention. Additionally, information handled by these devices is temporarily buffered in RAM during the processing thereof, and thereafter stored in various types of ROM or an HDD, read out, and modified/written by the CPU as necessary. A recording medium that stores the program may be any of a semiconductor medium (such as ROM or a non-volatile memory card, for example), an optical recording medium (such as a DVD, MO, MD, CD, or BD, for example), or a magnetic recording medium (such as magnetic tape or a flexible disk, for example). Also, rather than the functions of the embodiment discussed above being realized by executing a loaded program, in some cases the functions of the present invention may be realized by joint processing with an operating system, another application program, or the like.

Also, in the case of distribution into the market, the program may be distributed such as by being stored on a portable recording medium, or by being transferred to a server computer connected via a network such as the Internet. In this case, a storage device of the server computer is also included in the present invention. In addition, all or part of the base station device 1 and the terminal device 2 in the foregoing embodiments may also be realized as LSI, which is typically an integrated circuit. The various function blocks of the base station device 1 and the terminal device 2 may be realized as individual chips, or all or part thereof may be integrated as a single chip. Furthermore, the circuit integration methodology is not limited to embedded systems and may be also be realized with special-purpose circuits, or with general-purpose processors. In addition, if progress in semiconductor technology yields integrated circuit technology that may substitute for LSI, the use of an integrated circuit according to that technology is also possible.

The foregoing thus describes an embodiment of the present invention in detail and with reference to the drawings. However, specific configurations are not limited to this embodiment, and design modifications or the like within a scope that does not depart from the spirit of the present invention are to be included. Furthermore, various modifications of the present invention are possible within the scope indicated by the claims. Embodiments obtained by appropriately combining the technical means respectively disclosed in different embodiments are also included within the technical scope of the present invention. Additionally, configurations in which elements described in the foregoing embodiments and exhibiting similar advantageous effects are substituted with each other are also to be included.

Note that the present invention is not limited to the foregoing embodiments. A terminal device of the present invention is not limited to application to a mobile station, and obviously may also be applied to stationary or non-mobile electronic equipment installed indoors or outdoors, such as AV equipment, kitchen appliances, cleaning and laundry equipment, air conditioning equipment, office equipment, vending machines, and other consumer equipment, for example. In addition, the present invention is suitable for use in a radio base station device, a radio terminal device, a radio communication system, and a radio communication method.

REFERENCE SIGNS LIST 1 base station device
2 terminal device
101 higher layer processing unit
103 control unit
105 reception unit
107 transmission unit
109 channel measurement unit
111 transceiving antenna
1051 decoding unit
1053 demodulation unit
1055 demultiplexing unit
1057 radio reception unit
1071 encoding unit
1073 modulation unit
1075 multiplexing unit
1077 radio transmission unit
1079 downlink reference signal generation unit
201 higher layer processing unit
203 control unit
205 reception unit
207 transmission unit
209 channel measurement unit
211 transceiving antenna
2051 decoding unit
2053 demodulation unit
2055 demultiplexing unit
2057 radio reception unit
2071 encoding unit
2073 modulation unit
2075 multiplexing unit
2077 radio transmission unit
2079 uplink reference signal generation unit

The invention claimed is:

1. A terminal device comprising:
reception circuitry which receives a first configuration, a second configuration, and a grant; and
transmission unit circuitry which transmits, in a subframe, a physical uplink shared channel (PUSCH) scheduled based on the grant, wherein
in a case that the first configuration and the second configuration are configured, the transmission circuitry sets a transmit power of the PUSCH based on:
whether the grant is a first grant or a second grant, and
whether the subframe belongs to a first subframe set or a second subframe set.

2. The terminal device according to claim 1, wherein
the transmission circuitry sets the transmit power of the PUSCH based on a first power control in a case of a first case and a second case,
the transmission circuitry sets, irrespective of whether the uplink subframe belongs to the first subframe subset or a second subframe subset, the transmit power of the PUSCH based on a second power control in a case of a third case,
the first case being a case where the grant is the first grant,
the second case being a case where the subframe belongs to the second subframe set, and
the third case being a case where the grant is the second grant.

3. The terminal device according to claim 1, wherein
the first grant is a dynamic scheduled grant, and
the second grant is a random access response grant.

4. A communication method of a terminal device, comprising:
a step of receiving a first configuration, a second configuration, and a grant; and
a step of transmitting, in a subframe, a physical uplink shared channel (PUSCH) scheduled based on the grant, wherein
in a case that the first configuration and the second configuration are configured, the step of transmitting sets a transmit power of the PUSCH based on:
whether the grant is a first grant or a second grant, and
whether the subframe belongs to a first subframe set or a second subframe set.

5. An integrated circuit mounted onboard a terminal device, and causing the terminal device to perform:
a function of receiving a first configuration, a second configuration, and a grant; and
a function of transmitting, in a subframe, a physical uplink shared channel (PUSCH) scheduled based on the grant, wherein
in a case that the first configuration and the second configuration are configured, the function of transmitting sets a transmit power of the PUSCH based on:
whether the grant is a first grant or a second grant, and
whether the subframe belongs to a first subframe set or a second subframe set.

* * * * *